US012560777B2

(12) United States Patent
Goulinski et al.

(10) Patent No.: US 12,560,777 B2
(45) Date of Patent: *Feb. 24, 2026

(54) FOLDED CAMERAS WITH CONTINUOUSLY ADAPTIVE ZOOM FACTOR

(71) Applicant: Corephotonics Ltd., Tel Aviv (IL)

(72) Inventors: Nadav Goulinski, Tel Aviv (IL); Roy Rudnick, Tel Aviv (IL); Ephraim Goldenberg, Tel Aviv (IL); Itay Yedid, Tel Aviv (IL); Michael Dror, Tel Aviv (IL); Itay Manor, Tel Aviv (IL); Ziv Shemesh, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,743

(22) Filed: Jun. 11, 2025

(65) Prior Publication Data

US 2025/0306335 A1 Oct. 2, 2025

Related U.S. Application Data

(63) Continuation of application No. 18/900,755, filed on Sep. 29, 2024, now Pat. No. 12,360,332, which is a
(Continued)

(51) Int. Cl.
G02B 13/00 (2006.01)
G02B 7/10 (2021.01)
(Continued)

(52) U.S. Cl.
CPC ........... G02B 7/10 (2013.01); G02B 13/0045 (2013.01); G02B 13/02 (2013.01); G03B 17/17 (2013.01);
(Continued)

(58) Field of Classification Search
CPC .............. G02B 13/007; G02B 13/0065; G02B 15/1441; G02B 15/144101;
(Continued)

(56) References Cited

U.S. PATENT DOCUMENTS

2004/0051960 A1* 3/2004 Mihara ................ G02B 13/007
359/686
2008/0247053 A1* 10/2008 Iwasawa ........ G02B 15/145113
359/676
(Continued)

*Primary Examiner* — Ephrem Z Mebrahtu
(74) *Attorney, Agent, or Firm* — Nathan & Associates; Menachem Nathan

(57) ABSTRACT

Folded Tele cameras, comprising: an optical path folding element (OPFE) for a folding a first optical path OP1 to second optical path OP2, a lens including N lens elements, the lens being divided into four lens groups arranged along a lens optical axis and marked, in order from an object side of the lens to an image side of the lens, G1, G2, G3 and G4, and an image sensor, wherein the lens elements of a lens group do not move with respect to each other, wherein G1 and G3 do not move with respect to each other, wherein G2 and G4 do not move with respect to each other, wherein the Tele camera is configured to change a zoom factor (ZF) continuously between a minimum zoom factor marked $ZF_{MIN}$ corresponding to a minimal effective focal length marked $EFL_{MIN}$ and a maximum zoom factor marked $ZF_{MAX}$ corresponding to a maximal effective focal length marked $EFL_{MAX}$ by moving G1 and G3 together relative to the image sensor and by moving G2 and G4 together relative to the image sensor.

20 Claims, 20 Drawing Sheets

Related U.S. Application Data continuation of application No. 18/644,167, filed on Apr. 24, 2024, now Pat. No. 12,135,465, which is a continuation of application No. 17/925,857, filed as application No. PCT/IB2022/052515 on Mar. 20, 2022, now Pat. No. 12,001,078.

(60) Provisional application No. 63/300,067, filed on Jan. 17, 2022, provisional application No. 63/177,427, filed on Apr. 21, 2021, provisional application No. 63/164,187, filed on Mar. 22, 2021.

(51) Int. Cl.

| | | |
|---|---|---|
| *G02B 13/02* | (2006.01) | |
| *G03B 17/17* | (2021.01) | |
| *H04N 23/54* | (2023.01) | |
| *H04N 23/55* | (2023.01) | |
| *H04N 23/68* | (2023.01) | |
| *H04N 23/69* | (2023.01) | |

(52) U.S. Cl.
CPC .............. *H04N 23/54* (2023.01); *H04N 23/55* (2023.01); *H04N 23/687* (2023.01); *H04N 23/69* (2023.01)

(58) Field of Classification Search
CPC .... G02B 15/144103; G02B 15/144105; G02B 15/144107; G02B 15/144109; G02B 15/144111; G02B 15/144113; G02B 15/144115; H04N 23/54; H04N 23/55; H04N 23/69; H04N 23/687
See application file for complete search history.

(56) References Cited

U.S. PATENT DOCUMENTS

2015/0109485 A1* 4/2015 Ozaki ................. G02B 27/646
                                                    359/557
2022/0326486 A1* 10/2022 Chang ................... G02B 13/02

* cited by examiner

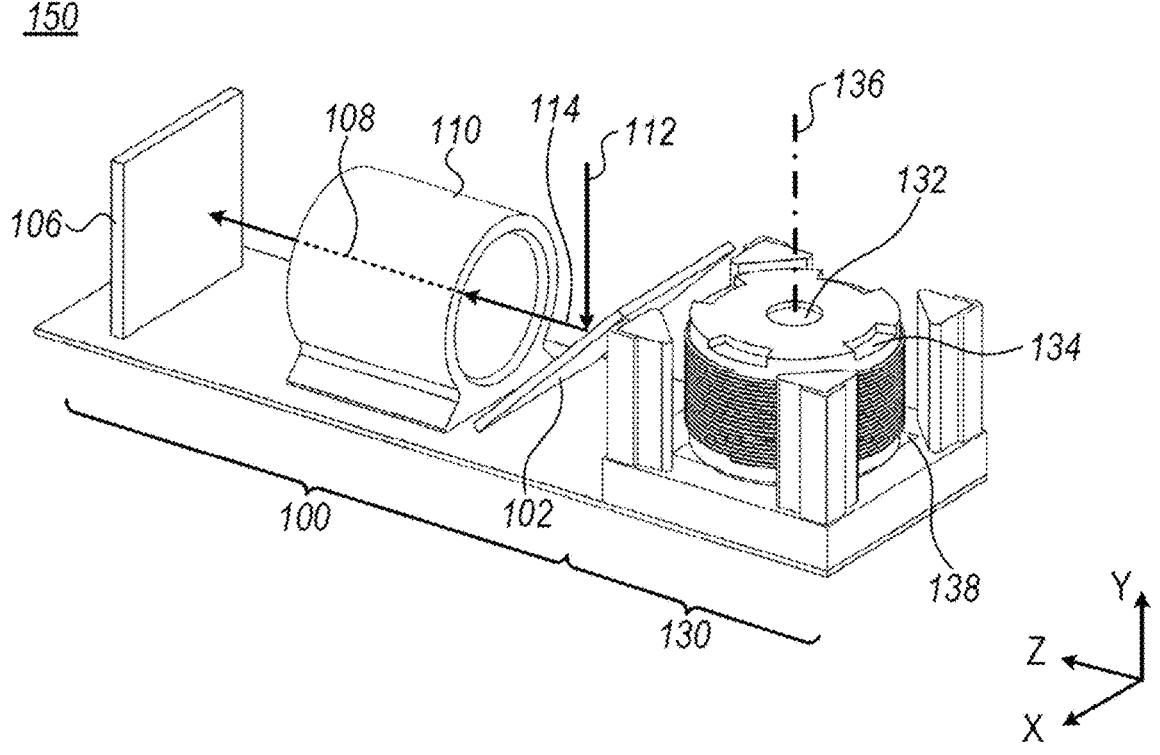
FIG. 1A             KNOWN ART

160

160

170

200

203

204

210

220

212

216

206

222

224

230

214

248

246

243

245

245

250

242

247

202

213

240

200

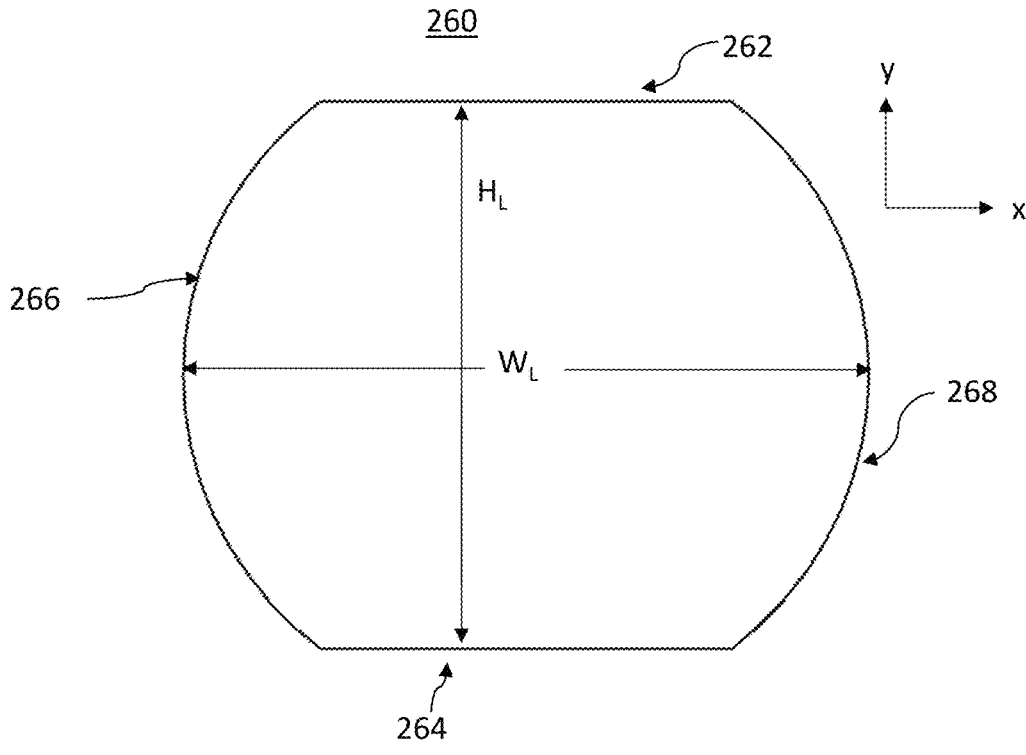
_260_
262
H_L
266
W_L
268
264
FIG. 2E                     KNOWN ART
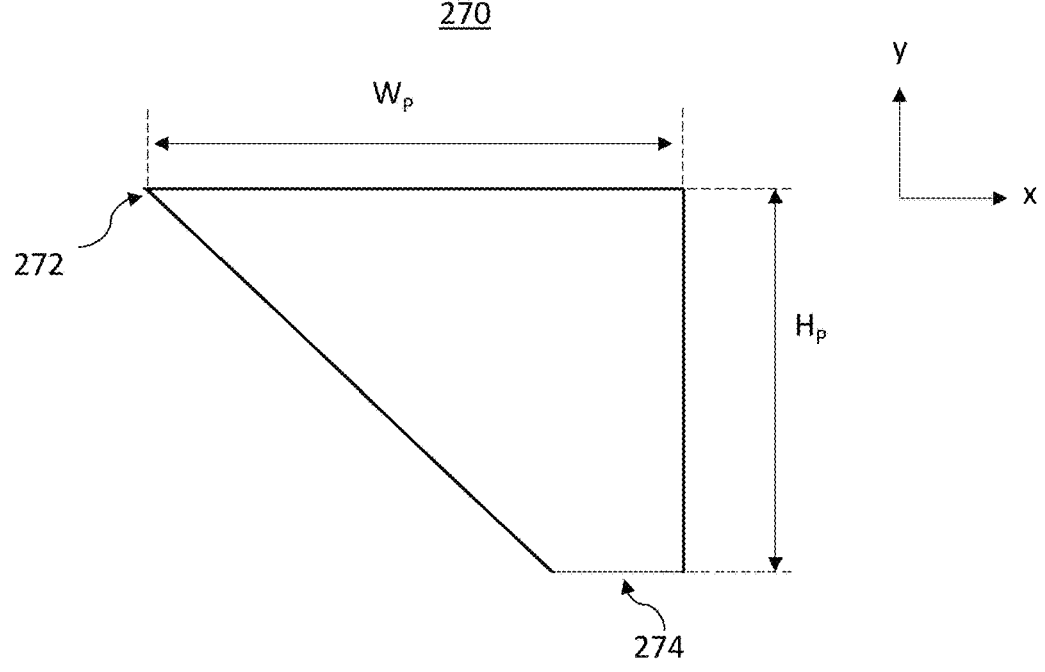
_270_
W_P
272
H_P
274
FIG. 2F                     KNOWN ART

210

204

306

210

204

306

308

312

220

220

<u>230</u>

<u>220</u>

600

FOLDED CAMERAS WITH CONTINUOUSLY ADAPTIVE ZOOM FACTOR

CROSS REFERENCE TO RELATED APPLICATIONS

This is a continuation of U.S. patent application Ser. No. 18/900,755 filed Sep. 29, 2024 (now allowed), which was a continuation of U.S. patent application Ser. No. 18/644,167 filed Apr. 24, 2024 (issued as U.S. Pat. No. 12,135,465), which was a continuation of U.S. patent application Ser. No. 17/925,857 filed Nov. 17, 2022 (issued as U.S. Pat. No. 12,001,078), which was a 371 application from international patent application No. PCT/IB2022/052515 filed Mar. 20, 2022, which claims benefit of priority from U.S. Provisional patent applications Nos. 63/164,187 filed Mar. 22, 2021, 63/177,427 filed Apr. 21, 2021, and 63/300,067 filed Jan. 17, 2022, all of which are incorporated herein by reference in their entirety.

FIELD

Embodiments (examples) disclosed herein relate in general to digital cameras, and more particularly, to multi-aperture zoom digital cameras with a folded continuous zoom lens for use in handheld electronic mobile devices such as smartphones.

Definitions

The following symbols and abbreviations are used, all of terms known in the art:

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (or an assembly of lens elements L1 to LN), the distance between a rear principal point P' and a rear focal point F' of the lens.

F number (F/#): the ratio of the EFL to an entrance pupil diameter.

BACKGROUND

Multi-aperture cameras (or "multi-cameras", of which a "dual-camera" having two cameras is an example) are now standard for handheld electronic mobile devices (or simply "mobile devices", for example smartphones, tablets, etc.). A multi-camera usually comprises a wide field-of-view FOV camera ("Wide" or "W" camera with $FOV_W$), and at least one additional camera with a narrower (than $FOV_W$) field-of-view (Telephoto, "Tele" or "T" camera, also referred to as "TC", with $FOV_T$). In general, the spatial resolution of the TC is constant (or "fixed") and may be for example 3, 5, or 10 times higher than the spatial resolution of the W camera. This is referred to as the TC having a fixed "zoom factor" (ZF) of, respectively, 3, 5, or 10.

As an example, consider a dual-camera having a W camera and a TC with ZF of 5. When zooming onto a scene, one may in general use W camera image data, which is digitally zoomed up to a ZF of 5. For a ZF≥5, one may use TC image data, digitally zoomed for ZF>5. In some scenes, a high ZF is desired for capturing scene segments with high spatial resolution. In other scenes, a high ZF is undesired, as only (digitally zoomed) W camera image data may be available. This shows the trade-off between the applicability range of the TC on the one hand (which is larger for TCs with smaller ZF) and the TC's zoom capability on the other hand (which is larger for TCs with larger ZF). In general, both large applicability range and large zoom capability are beneficial. This cannot be achieved in known TCs having a fixed ZF.

For a given image sensor included in a TC, the TC's ZF is determined solely by its EFL. A TC that can switch continuously between two extreme (minimal and maximal) EFLs, $EFL_{MIN}$ and $EFL_{MAX}$, for providing any ZF between minimal and maximal ZFs $ZF_{MIN}$ and $ZF_{MAX}$, is described for example in co-owned international patent application PCT/IB2021/061078.

There is need for, and it would be beneficial to have a Tele camera that can provide all ZFs between $ZF_{MIN}$ and $ZF_{MAX}$ Wherein $ZF_{MAX} \geq 2 \times ZF_{MIN}$, continuously and in a slim camera module form factor having large aperture heights for a given camera module's height and by requiring relatively small lens stroke ranges for switching between $ZF_{MIN}$ and $ZF_{MAX}$.

SUMMARY

In various examples, there are provided cameras, comprising: an OPFE for a folding a first optical path OP1 to second optical path OP2; a lens including N lens elements, the lens being divided into four lens groups arranged along a lens optical axis and marked, in order from an object side of the lens to an image side of the lens, G1, G2, G3 and G4; and an image sensor, the camera is a folded Tele camera, the lens elements of a lens group do not move with respect to each other, G1 and G3 do not move with respect to each other, G2 and G4 do not move with respect to each other, the Tele camera is configured to change a zoom factor (ZF) continuously between $ZF_{MIN}$ corresponding to $EFL_{MIN}$ and $ZF_{MAX}$ corresponding to $EFL_{MAX}$ by moving G1 and G3 together relative to the image sensor and by moving G2 and G4 together relative to the image sensor, wherein $ZF_{MAX}/ZF_{MIN} \geq 2$, wherein switching from $EFL_{MIN}$ to $EFL_{MAX}$ or vice versa requires a lens stroke range S, and wherein a ratio R given by $R = (EFL_{MAX} - EFL_{MIN})/S$ fulfils R>2.

In some examples, R>3. In some examples, R>5.

In some examples, $ZF_{MAX}/ZF_{MIN} \geq 2.5$. In some examples, $ZF_{MAX}/ZF_{MIN} \geq 2.75$.

In some examples, the configuration to change the ZF continuously includes a configuration to move G1 and G3 together relative to the image sensor over a small range larger than 0.1 mm and smaller than 5 mm and to move G2 and G4 together relative to the image sensor over a large range larger than 2 mm and smaller than 15 mm.

In some examples, the configuration to change the ZF continuously includes a configuration to move G1 and G3 together relative to the image sensor over a small range larger than 0.2 mm and smaller than 2.5 mm, and to move G2 and G4 together relative to the image sensor over a large range larger than 4 mm and smaller than 10 mm.

In some examples, the configuration to change the ZF continuously includes a configuration to move G2 and G4 together relative to the image sensor over a small range larger than 0.1 mm and smaller than 5 mm, and to move G1 and G3 together relative to the image sensor over a large range larger than 2 mm and smaller than 15 mm.

In some examples, the configuration to change the ZF continuously includes a configuration to move G2 and G4 together relative to the image sensor over a small range larger than 0.2 mm and smaller than 2.5 mm, and to move the G1 and G3 together relative to the image sensor over a large range larger than 4 mm and smaller than 10 mm.

In some examples, G1 and G3 are included in a single G13 carrier and G2 and G4 are included in a single G24 carrier.

In some examples, both the G24 carrier and the G13 carrier include rails for defining a position of the G13 carrier relative to the G24 carrier.

In some examples, a maximum stroke range of the G13 carrier is S13, a maximum stroke range of the G24 carrier is S24, and a ratio $S24/S13>7.5$. In some examples, $S24/S13>12.5$.

In some examples, the G24 and G13 carriers are movable by, respectively, G24 and G13 actuators. In some examples, one of the G24 actuator or the G13 actuator includes three or more magnets.

In some examples, the lens includes $N=10$ lens elements.

In some examples, a power sequence of lens groups G1-G4 is positive-negative-positive-positive.

In some examples, G1 includes two lens elements with a positive-negative power sequence, G2 includes two lens elements with a negative-negative power sequence, G3 includes three lens elements with a positive-positive-positive power sequence, and G4 includes three lens elements with a positive-negative-positive power sequence.

In some examples, G1 includes two lens elements with a positive-negative power sequence, G2 includes two lens elements with a negative-positive power sequence, G3 includes three lens elements with a positive-negative-positive power sequence, and G4 includes three lens elements with a positive-negative-positive power sequence.

In some examples, G1 includes two lens elements with a negative-positive power sequence, G2 includes three lens elements with a positive-negative-negative power sequence, G3 includes three lens elements with a positive-negative-negative power sequence, and G4 includes two lens elements with a negative-positive power sequence.

In some examples, the camera has a F number F/#, the F/# at $ZF_{MIN}$ is $F/\#_{MIN}$, the F/# at $ZF_{MAX}$ is $F/\#_{MAX}$, and $EFL_{MAX}/EFL_{MIN}>F/\#_{MAX}/F/\#_{MIN}$. In some examples, $EFL_{MAX}/EFL_{MIN}>F/\#_{MAX}/F/\#_{MIN}+0.5$.

In some examples, a magnitude of an EFL of G2 $|EFL_{G2}|$ varies less than 10% from a magnitude of an EFL of G3 $|EFL_{G3}|$, and $|EFL_{G2}|$, $|EFL_{G3}|<EFL_{MIN}$.

In some examples, lens groups G1 and G2 include 2 lens elements, and lens group G3 and G4 include 3 lens elements.

In some examples, the larger of a thickness $T_{G2}$ of G2 and of a thickness $T_{G1}$ of G1 is $T(G1,G2)_{MAX}$, the smaller of $T_{G2}$ and $T_{G1}$ is $T(G1,G2)_{MIN}$, and $T(G1,G2)_{MIN}/T(G1,G2)_{MAX}<0.8$. In some examples, $0.75<T(G1,G2)_{MIN}/T(G1,G2)_{MAX}<1.0$.

In some examples, a ratio of a thickness $T_{G4}$ of G4 and a thickness $T_{G3}$ of G3 fulfill $0.9<T_{G4}/T_{G3}<1.1$.

In some examples, the larger of $T_{G3}$ and $T_{G4}$ is $T(G3,G4)_{MAX}$, the smaller of $T_{G3}$ and $T_{G4}$ is $T(G3,G4)_{MIN}$, and $T(G1,G2)_{MAX}/T(G3,G4)_{MIN}<0.5$. In some examples, $0.5<T(G3,G4)_{MIN}/T(G3,G4)_{MAX}<0.75$. In some examples, $0.9<T(G1,G2)_{MAX}/T(G3,G4)_{MIN}<1.1$.

In some examples, lens groups G1 and G4 include 2 lens elements, and lens groups G2 and G3 include 3 lens elements.

In some examples, the camera includes an aperture stop, and the aperture stop is located at a front surface of a first lens element of G2. In some examples, the aperture stop is located at a rear surface of a second lens element of G2. In some examples, aperture stop is located at the front surface of the first lens element of G3.

In some examples, an EFL of G1 ($EFL_{G1}$) varies less than 50% from an EFL of G4 ($EFL_{G4}$), and both $EFL_{G1}$ and $EFL_{G4}$ vary by less than 20% from $(EFL_{MAX}+EFL_{MIN})/2$. In some examples, $EFL_{G1}$ varies less than 50% from $EFL_{G4}$ and both $EFL_{G1}$ and $EFL_{G4}$ vary by less than 20% from $(EFL_{MAX}+EFL_{MIN})/2$. In some examples, $EFL_{G4}>10\times EFL_{MAX}$.

In some examples, $EFL_{G1}<0.15\times EFL_{G4}$, and both $EFL_{G1}$ and $EFL_{G4}$ vary by less than 20% from $(EFL_{MAX}+EFL_{MIN})/2$. In some examples, $EFL_{G4}>10\times EFL_{MIN}$.

In some examples, G1 and G3 have each at least two lens elements, and the first two lens elements in each of G1 and G3 are separated from each other on the lens optical axis by $<0.75$ mm.

In some examples, G1 and G3 have each at least two lens elements, and the first two lens elements in each of G1 and G3 are separated from each other on the lens optical axis by $<0.1\times EFL_{MIN}$.

In some examples, first two lens elements in G2 and in G4 are separated from each other at margins of each lens element by $<0.1$ mm. In some examples, first two lens elements in G2 and in G4 are separated from each other at margins of each lens element by $<0.01\times EFL_{MIN}$.

In some examples, the N lens elements include a first lens element L1, a second lens element L2, an eighth lens element L8 and a ninth lens element L9, and L1 and L2 and L8 and L9 form respective doublet lenses.

In some examples, first two lens elements in G2 and in G4 are separated from each other at margins of each lens element by $<0.1$ mm. In some examples, first two lens elements in G2 and in G4 are separated from each other at margins of each lens element by $<0.01\times EFL_{MIN}$.

In some examples, the N lens elements include a first lens element L1, a second lens element L2, a third lens element L3, a fourth lens element L4, a sixth lens element L6, a seventh lens element L7, an eight lens element L8 and a ninth lens element L9, L1 and L2, L3 and L4, and L8 and L9 form respective doublet lenses, and L6 and L7 form an inverted doublet lens.

In some examples, a maximum distance between lens elements of the moving groups G1 and G3 is smaller than $0.1\times EFL_{MIN}$.

In some examples, the N lens elements include a first lens element L1, a second lens element L2, a third lens element L3, a fourth lens element L4, an seventh lens element L7 and an eighth lens element L8, L1 and L2, L3 and L4, form respective inverted doublet lenses, and L7 and L8 form a doublet lens.

In some examples, a difference between distances of the OPFE from the front surface of the first lens element lens measured along an axis parallel to the lens optical axis for all ZFs is marked $\Delta d$, and a ratio of $\Delta d$ and a lens thickness $T_{Lens}$ fulfils $\Delta d/T_{Lens}<0.25$ when $\Delta d<4$ mm. In some examples, $\Delta d/T_{Lens}<0.05$ for $\Delta d<1$ mm.

In some examples, the camera has an aperture diameter $DA_{MIN}$ at $EFL_{MIN}$ and a minimum F number $F/\#_{MIN}=EFL_{MIN}/DA_{MIN}$, and $F/\#_{MIN}$ is $<4$. In some examples, $F/\#_{MIN}$ is $<3$. In some examples, $F/\#_{MIN}$ is $<2.5$.

In some examples, the camera has an aperture diameter $DA_{MAX}$ at $EFL_{MAX}$, and a maximum F number $F/\#_{MAX}=EFL_{MAX}/DA_{MAX}$, and $4.4<F/\#_{MAX}<6$.

In some examples, $DA_{MIN}/DA_{MAX} > 0.4$. In some examples, $DA_{MIN}/DA_{MAX} > 0.5$. In some examples, $DA_{MIN}/DA_{MAX} > 0.75$. In some examples, 5 mm$< DA_{MAX} < 7$ mm.

In some examples, $F/\#_{MIN} = EFL_{MIN}/DA_{MIN}$, $F/\#_{MAX} = EFL_{MAX}/DA_{MAX}$, and $F/\#_{MAX}/F/\#_{MIN} < 1.3-3$.

In some examples, the lens has a maximum total track length $TTL_{MAX}$, and $TTL_{MAX}/EFL_{MAX} < 1.2$. In some examples, $TTL_{MAX}/EFL_{MAX} < 1.1$.

In some examples, the camera is configured to be focused by moving lens groups G1+G2+G3+G4 together as one lens.

In some examples, the camera is included in a camera module having a module height $H_M$, the lens has a lens aperture height $H_A$, both $H_M$ and $H_A$ are measured along an axis parallel to OP1, $H_M$=5 mm-15 mm, $H_A$=3 mm-10 mm, and $H_M < H_A + 3$ mm. In some examples, $H_M < H_A + 2$ mm.

In some examples, the OPFE is configured to be rotated for optical image stabilization (OIS) along two rotation axes, a first rotation axis parallel to OP1 and a second rotation axis perpendicular to both OP1 and OP2.

In some examples, the OPFE is a prism.

In some examples, the prism is a cut prism with a prism optical height $H_P$ measured along an axis parallel to OP1 and with a prism optical width $W_P$ measured along an axis perpendicular to both OP1 and OP2, and $W_P$ is larger than $H_P$ by between 5% and 30%.

In some examples, the lens is a cut lens with a cut lens aperture height $H_A$ measured along an axis parallel to OP1 and with a lens aperture width $W_A$ measured along an axis perpendicular to both OP1 and OP2, and $W_A$ is larger than $H_A$ by between 5% and 50%.

In some examples, $EFL_{MAX}$ is between 24 mm and 30 mm.

In some examples, $EFL_{MIN} \geq 9$ mm.

In some examples, the folded Tele camera is included in a dual-camera along with a Wide camera having a field-of-view larger than the folded Tele camera. In some examples, there is provided a smartphone comprising a dual-camera as above.

In some examples, there is provided a smartphone comprising any of the cameras above or below.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings:

FIG. 1A illustrates a dual-camera that comprises a known folded continuous zoom T camera (or "FCZT camera") as disclosed herein together with a W camera;

FIG. 2E shows an example a cut lens;

FIG. 2F shows an example of a cut prism;

DETAILED DESCRIPTION

Figure 1B:
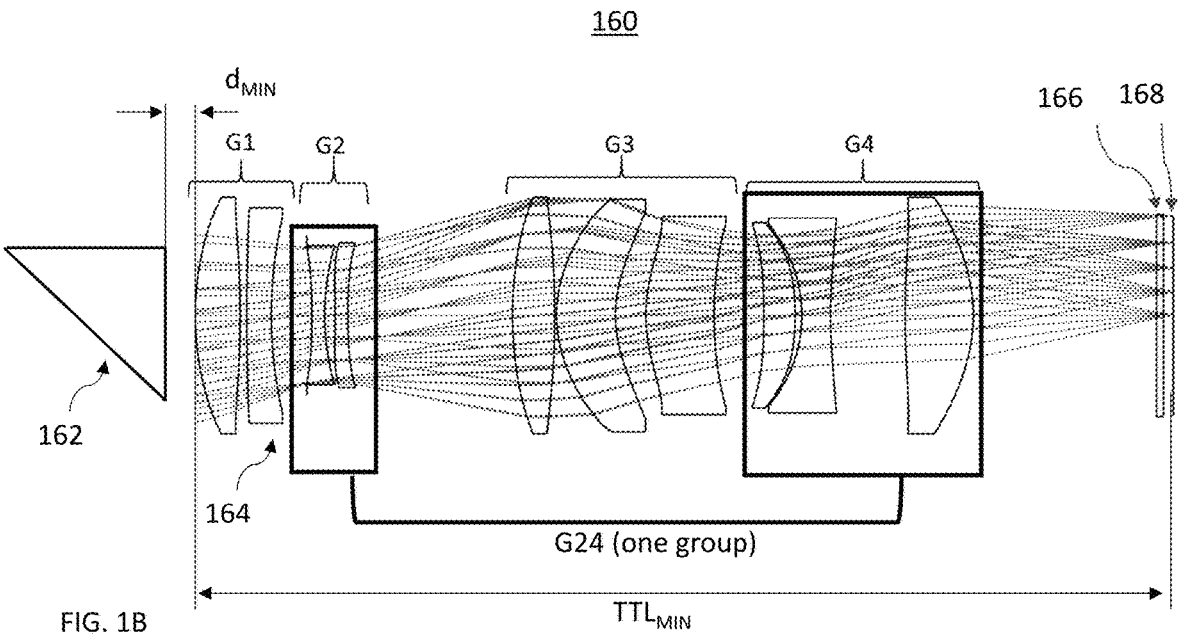
FIG. 1B shows schematically an embodiment of a G24 FCZT camera disclosed herein in a first, minimal zoom state with $ZF_{MIN}$ and $EFL_{MIN}$.

FIG. 1A illustrates a dual-camera 150 that comprises a folded continuous zoom T camera (or "FCZT camera") 100 as disclosed herein together with a W camera 130. T camera 100 comprises an optical path folding element (OPFE) 102 e.g. a prism or mirror, a lens 110 with a plurality of lens elements (not visible in this representation) having a lens optical axis 108 and an image sensor 106. OPFE folds an optical path from a first optical path 112 ("OP1") to a second optical path 114 ("OP2"). W camera 130 comprises a lens 134 with an optical axis 136 and an image sensor 138.

FIG. 1B shows schematically an embodiment of a FCZT camera disclosed herein and numbered 160 in a first, minimal zoom state (with a minimal zoom factor $ZF_{MIN}$) having a minimal $EFL=EFL_{MIN}$. $EFL_{MIN}$ corresponds to a minimal $ZF_{MIN}$. FCZT camera 160 comprises an OPFE 162, a lens 164, an (optional) optical element 166 and an image sensor 168. Camera 160 is shown with ray tracing. Optical element 166 may be for example an infra-red (IR) filter, and/or a glass image sensor dust cover. Lens 164 is divided in four lens groups ("G1", "G2", "G3" and "G4"), wherein each lens group may include one or more lens elements. Lens elements included in each of G1, G2, G3 and G4 are fixedly coupled to each other, meaning that the lens elements included in each of G1, G2, G3 and G4 can move with respect to the lens elements included in any other lens group and with respect to other components included in camera 160 (such as image sensor 168), but not with respect to each other. Further, G2 and G4 are fixedly coupled and move together as one group (group "G24" see marked). The G24 group is moved with a large stroke, G1+G2+G3+G4 are moved together as one lens with a small stroke, while G1 and G3 can move together independently of the G24 group.

Figure 1C:
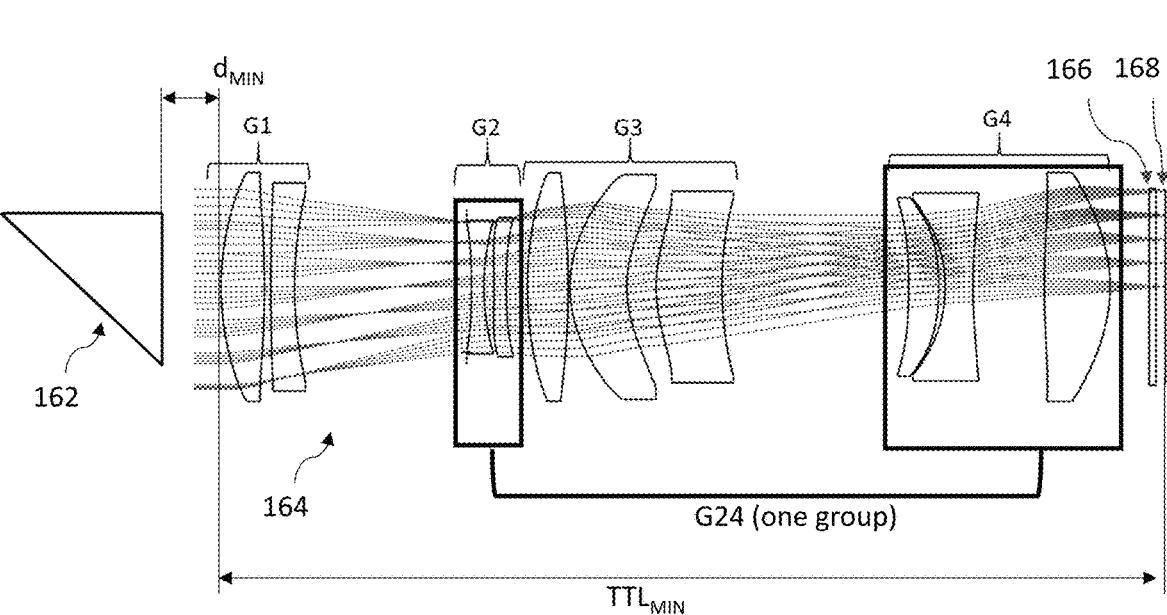
FIG. 1C shows the FCZT camera of FIGS. 1A and 1B schematically in a second, maximal zoom state with $ZF_{MAX}$ and $EFL_{MAX}$.

FIG. 1C shows FCZT camera 160 schematically in a second, maximal zoom state (with a maximal zoom factor $ZF_{MAX}$) having a maximal $EFL=EFL_{MAX}$. The transition or switching from $EFL_{MAX}$ to $EFL_{MIN}$ can be performed continuously, i.e. camera 160 can be switched to any other ZF that satisfies $ZF_{MIN} \leq ZF \leq ZF_{MAX}$ (or $EFL_{MIN} \leq EFL \leq EFL_{MAX}$).

This functionality is known in zoom camera lenses that are used for example in relatively large handheld camera devices such as digital single-lens reflex (DSLR) cameras. Camera 160 can provide this known functionality while having size dimensions that allow it to be integrated in a camera module such as a G24 FCZT camera module 200 (FIG. 2), which fits the size constraints of handheld (portable) electronic mobile devices such as smartphones. To clarify, all camera modules and optical lens systems disclosed herein may beneficially be included or incorporated in smartphones.

For changing ZF, the G24 group is moved with a large stroke, (e.g. of 2 mm or more) with respect to G1, G3 and image sensor 168. In addition and dependent on the particular desired EFL, G1+G2+G3+G4 are moved together as one lens with a small maximum stroke $\Delta d$ ($\Delta d \leq 0.25$ mm see FIG. 6C, $\Delta d \leq 0.7$ mm see FIG. 7C) with respect to image sensor 168. Because of this movement required for ZF change, camera 160 is referred to as a "G24 FCZT camera". The G24 FCZT camera may include a G24 optical lens system as shown and described for example with reference to FIGS. 6A-C and FIGS. 7A-C.

Figure 6A:
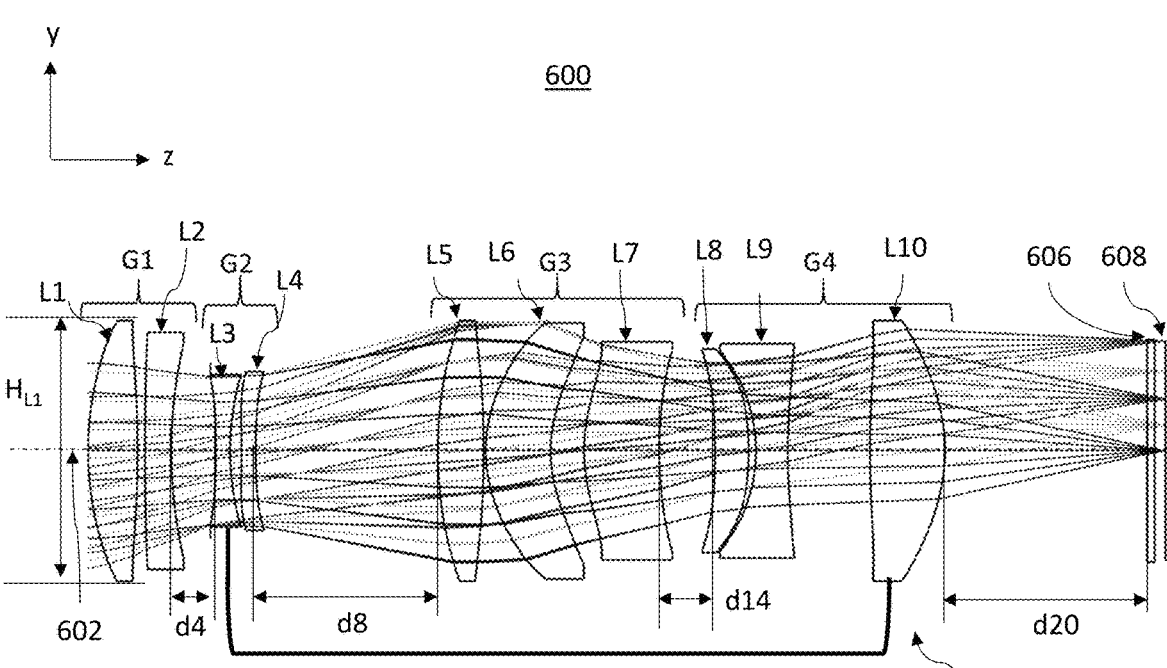
FIG. 6A shows a first example of an optical lens system disclosed herein in a first, minimal zoom state having an $EFL_{MIN}$=9.6 mm.
Figure 6B:
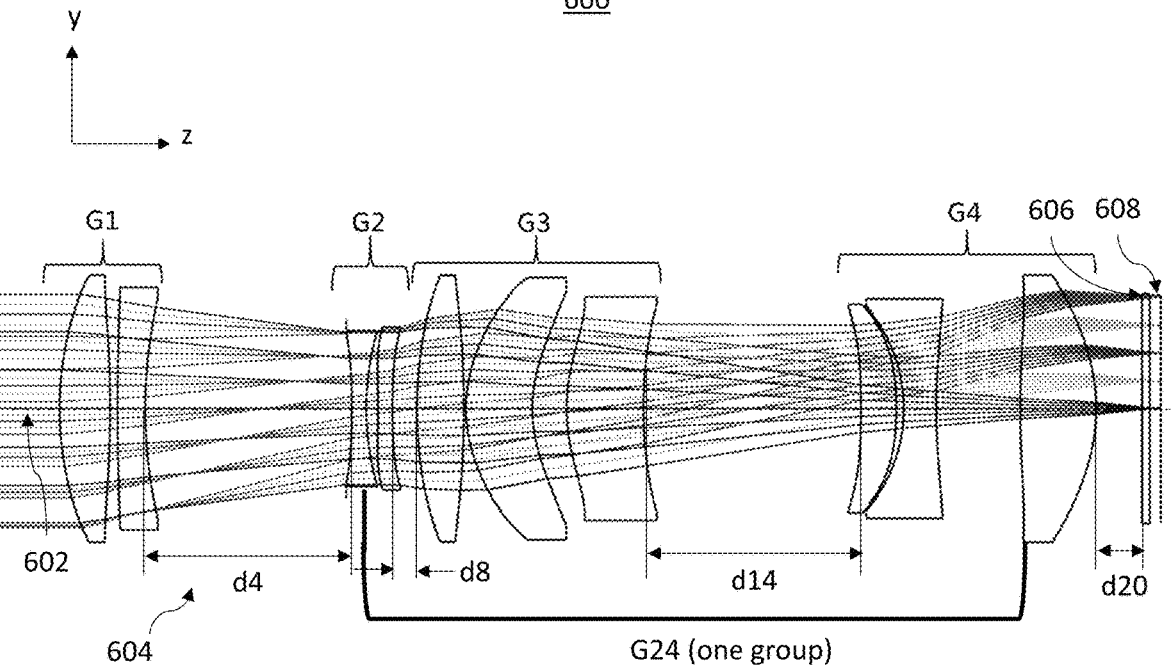
FIG. 6B shows the optical lens system of FIG. 6A in a second, maximum zoom state having an $EFL_{MAX}$=24.0 mm.
Figure 6C:
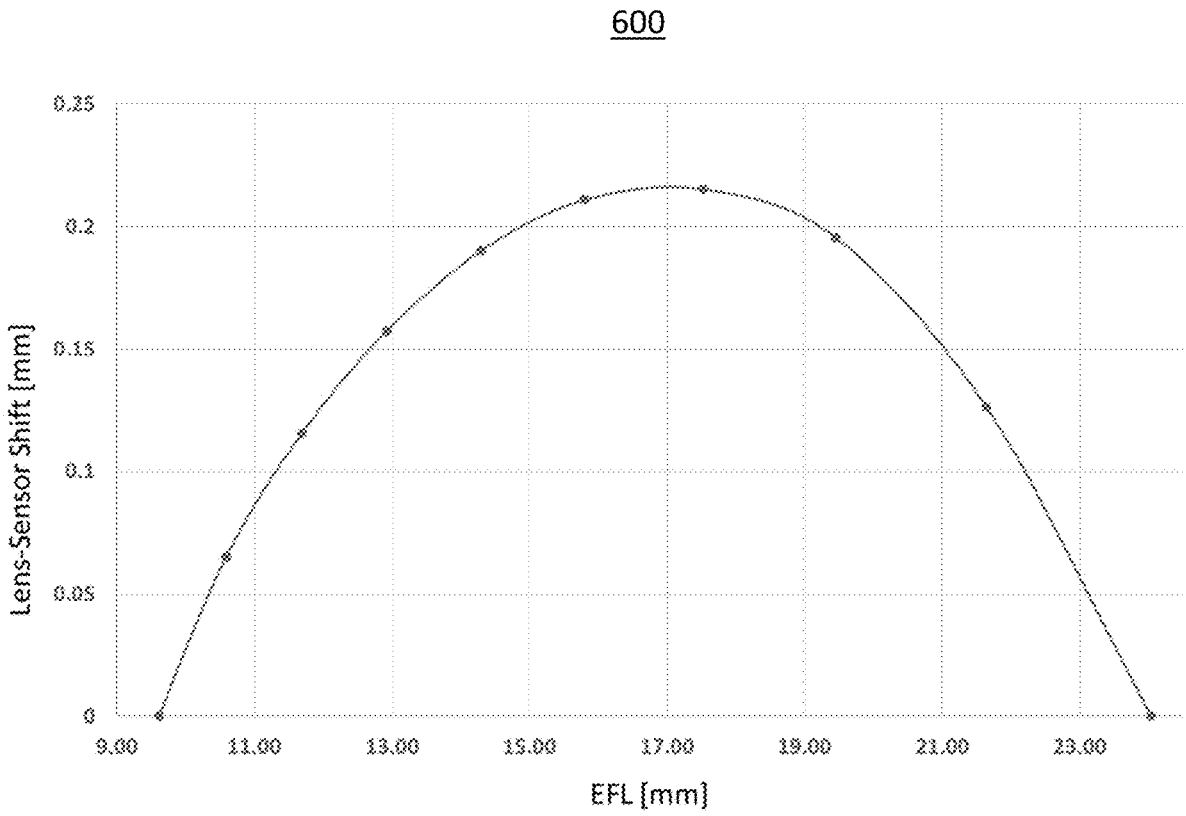
FIG. 6C gives the values for $\Delta d$ for the optical lens system of FIGS. 6A-B, as defined in FIGS. 1B-1C.
Figure 7A:
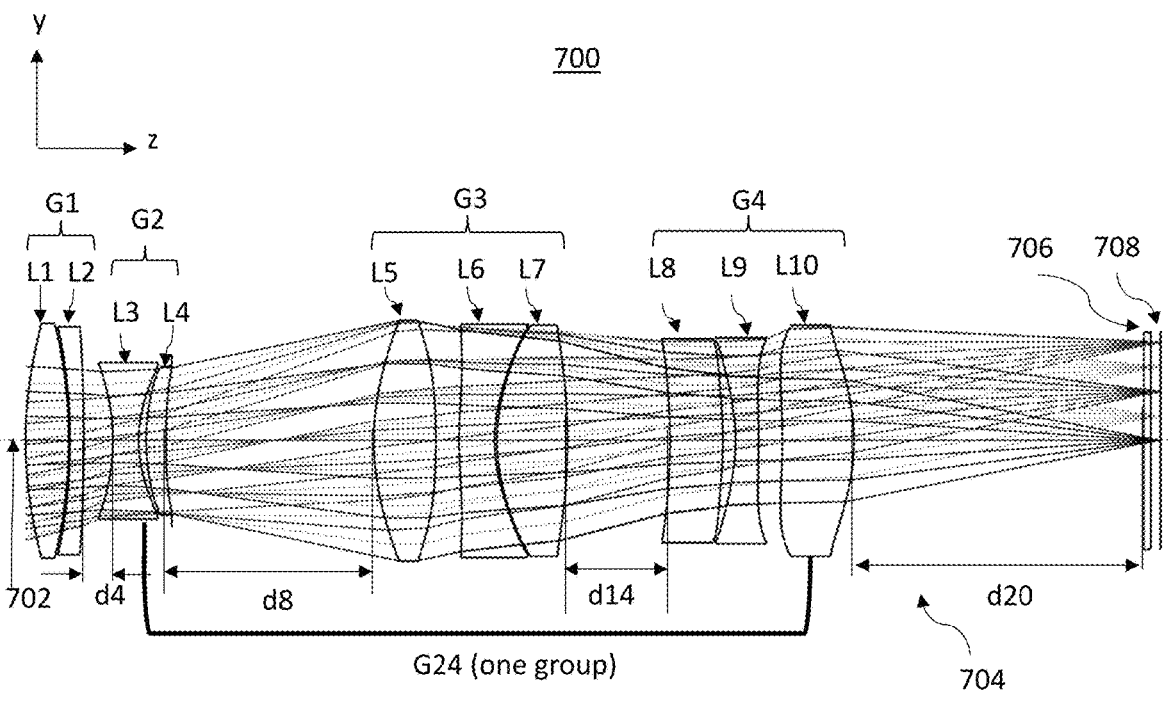
FIG. 7A shows a second example of an optical lens system disclosed herein in a minimal zoom state having an $EFL_{MIN}$=9.96 mm.
Figure 7B:
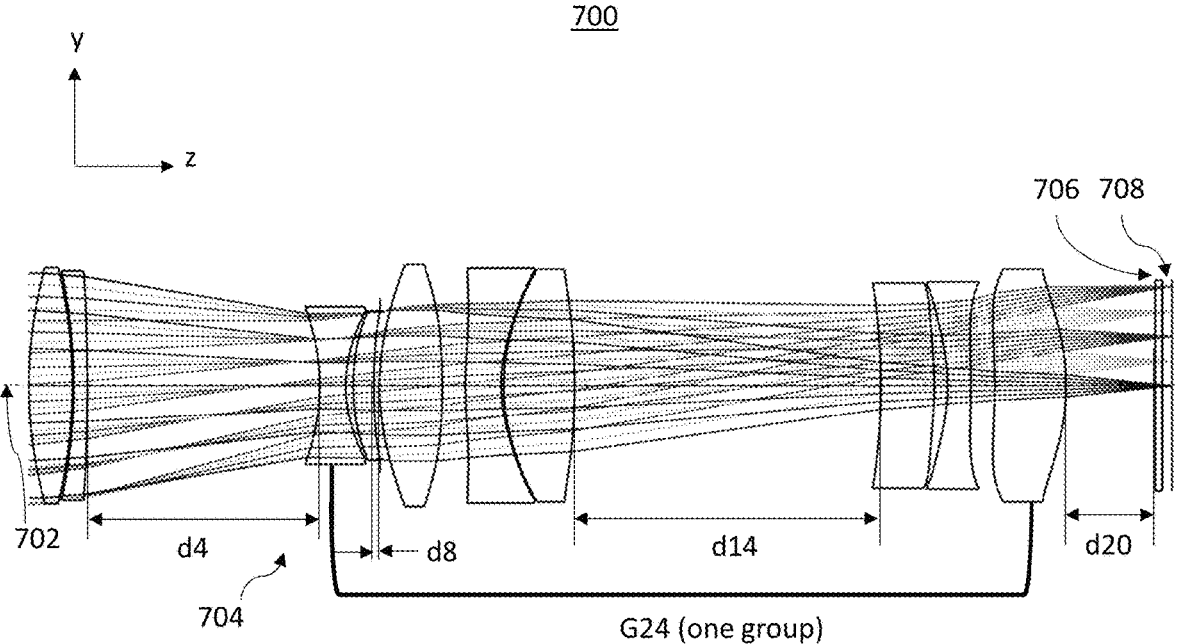
FIG. 7B shows the optical lens system of FIG. 7A in a maximum zoom state having an $EFL_{MAX}$=27.0 mm.
Figure 7C:
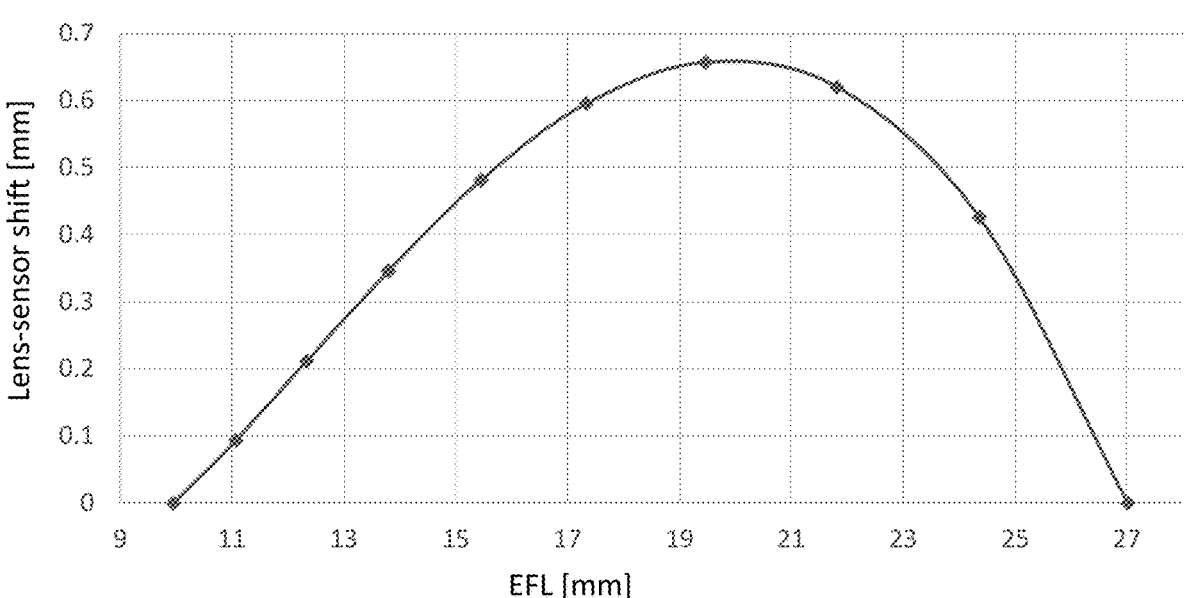
FIG. 7C gives the values for $\Delta d$ for the optical lens system of FIGS. 7A-B, as defined in FIGS. 1B-1C.

For situations with camera 160 focused to infinity, a distance "d" between OPFE 162 and lens 164, measured from OPFE 162 to the first surface of the first lens element in G1 along an axis parallel to the lens optical axis, shown (in FIG. 1B) in the $EFL_{Min}$ state ($d_{Min}$) and (in FIG. 1C) in the $EFL_{Max}$ state ($d_{Min}$), changes slighty for intermediate states $EFL_{Min} \leq EFL \leq EFL_{Max}$ as detailed in FIG. 6C and FIG. 7C. For any arbitrary pair of EFL states $EFL_1$ and $EFL_2$ ($EFL_{Min} \leq EFL_1$, $EFL_2 \leq EFL_{Max}$) with respective distances $d_1$ and $d_2$ between OPFE 162 and lens 164, a difference $\Delta d = |d_1 - d_2|$ between the distances fulfils $\Delta d < 1$ mm. A small $\Delta d$ is beneficial for a slim camera module, as it allows using a small OPFE. After a ZF change, moving lens 164 by $\Delta d$ with respect to image sensor 168 (and thus moving lens 164 by $\Delta d$ with respect to OPFE 162) is required to focus camera 160 to infinity.

Figure 1D:
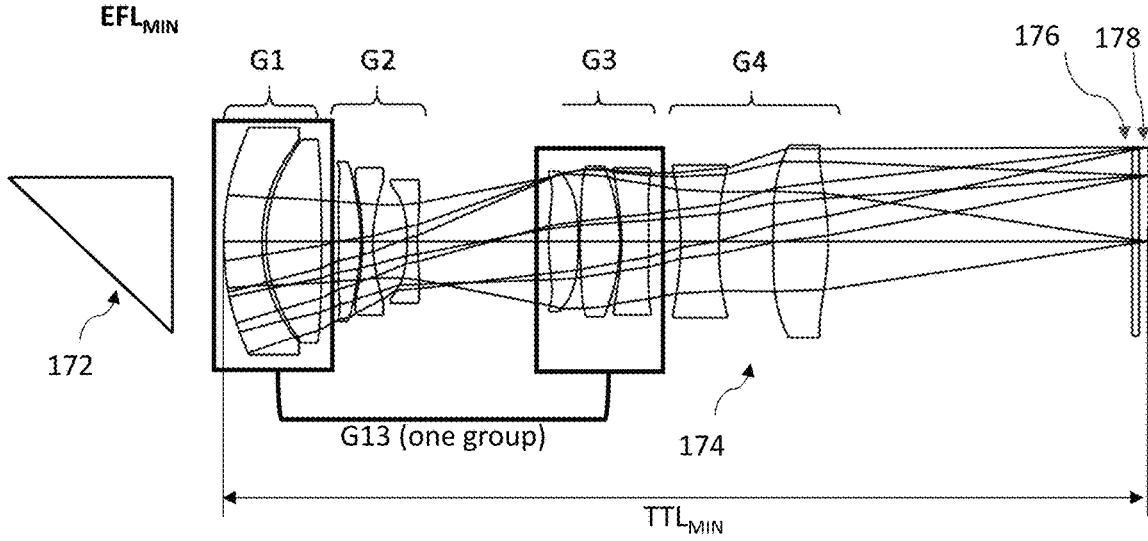
FIG. 1D shows schematically an embodiment of a G13 FCZT camera disclosed herein and in a first, minimal zoom state with $ZF_{MIN}$ and $EFL_{MIN}$.

FIG. 1D shows schematically another embodiment of a FCZT camera disclosed herein and numbered 170 in a first, minimal zoom state having $EFL_{MIN}$. $EFL_{MIN}$ corresponds to a minimal $ZF_{MIN}$. FCZT camera 170 comprises an OPFE 172, a lens 174, an (optional) optical element 176 and an image sensor 178. Lens 174 is divided in four lens groups ("G1", "G2", "G3" and "G4"), wherein each lens group may include one or more lens elements. Lens elements included in each of G1, G2, G3 and G4 are fixedly coupled to each other. Further, G1 and G3 are fixedly coupled and move together as one group (group "G13" see marked), while G2 and G4 can move independently of the G13 group.

Figure 1E:
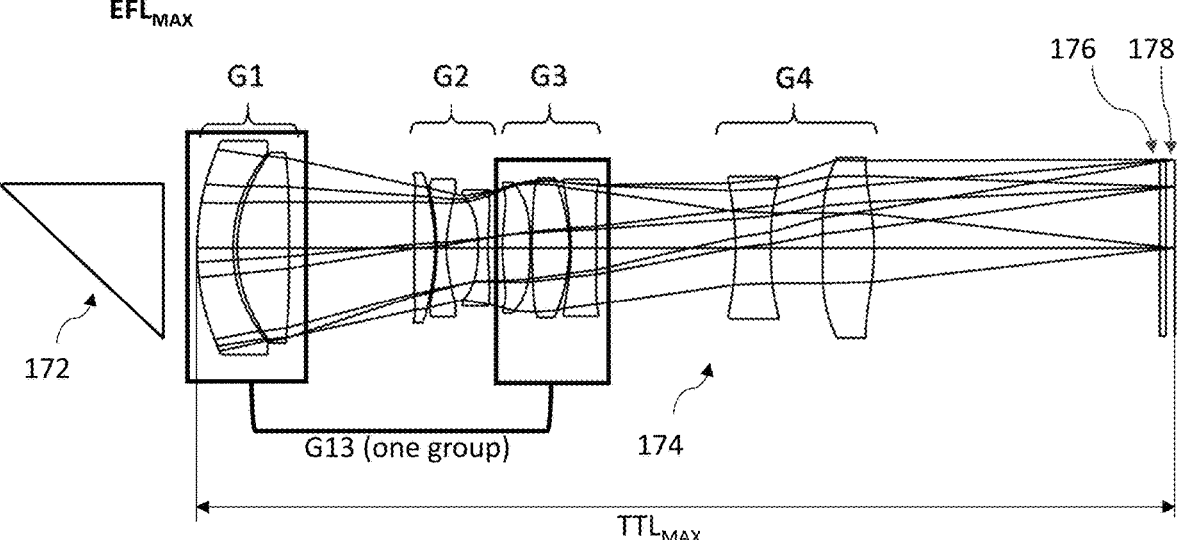
FIG. 1E shows the FCZT camera of FIG. 1D schematically in a second, maximal zoom state with $ZF_{MAX}$ and $EFL_{MAX}$.

FIG. 1E shows FCZT camera 170 schematically in a second, maximal zoom state having $EFL_{MAX}$. As in camera 160, the transition or switching from $EFL_{MAX}$ to $EFL_{MIN}$ can be performed continuously, i.e. camera 170 can be switched to any other ZF that satisfies $ZF_{MIN} \leq ZF \leq ZF_{MAX}$.

Figure 8A:
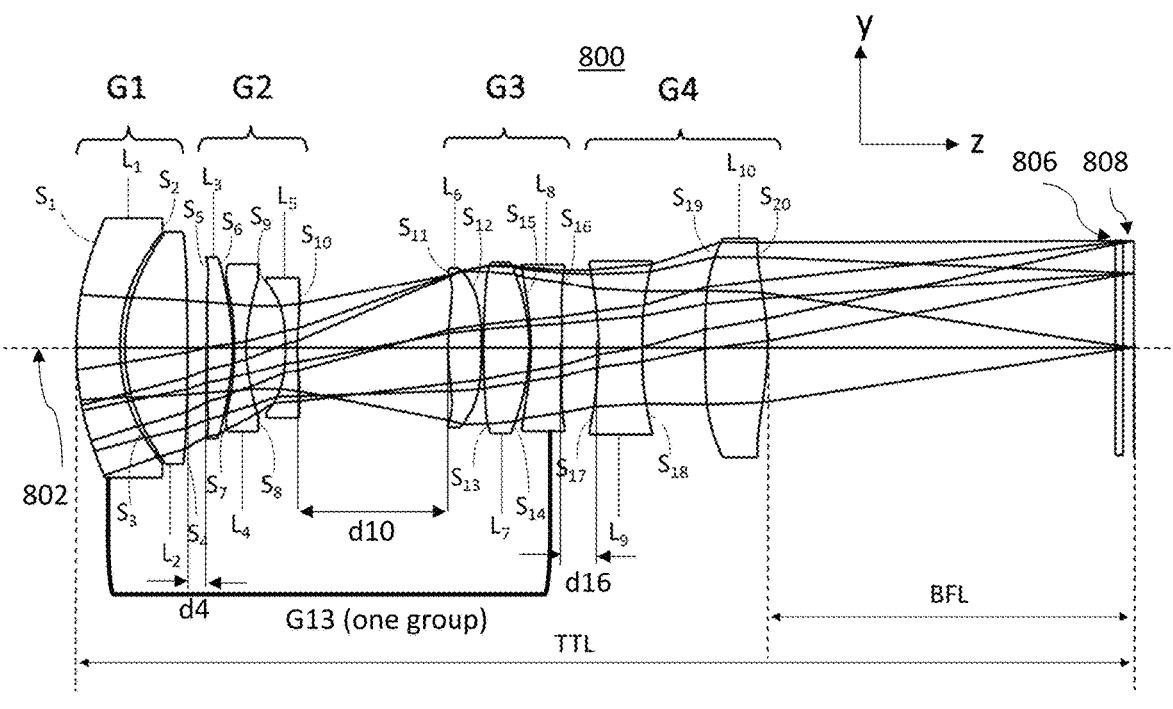
FIG. 8A shows a third example of an optical lens system disclosed herein in a minimal zoom state having an $EFL_{MIN}$=10 mm.
Figure 8B:
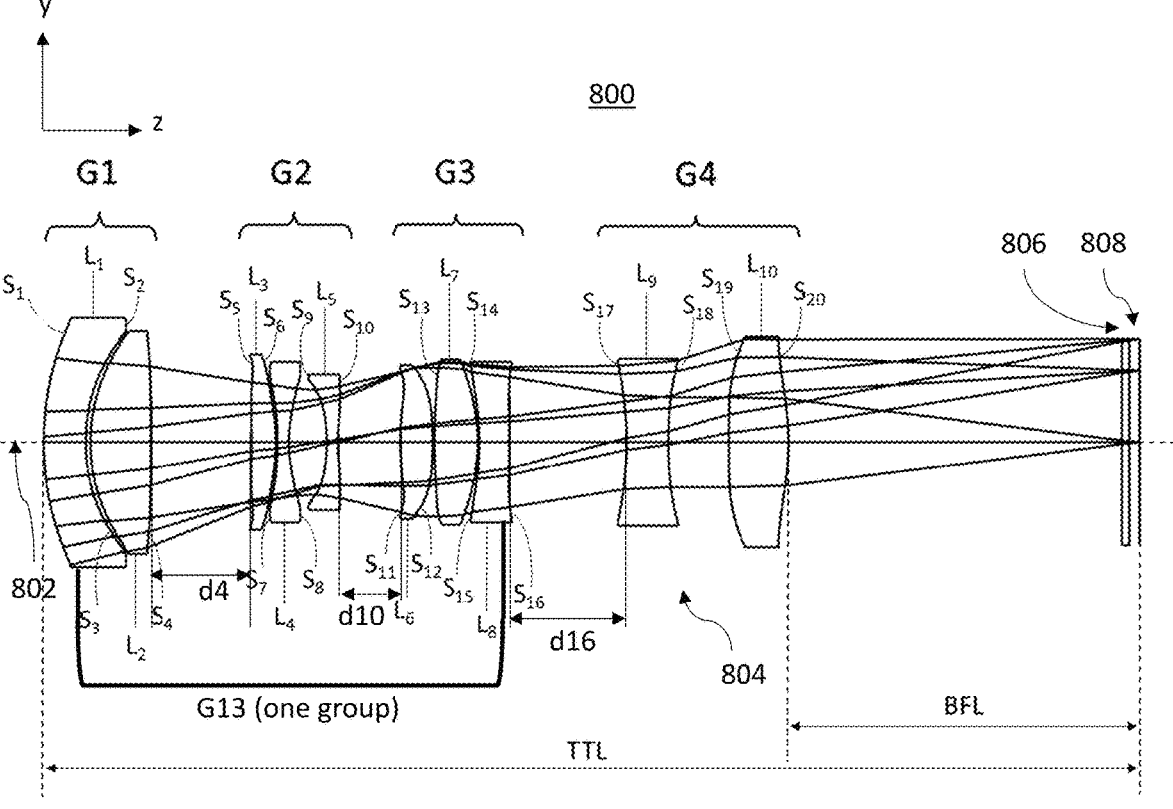
FIG. 8B shows the optical lens system of FIG. 8A in an intermediate zoom state having an $EFL_{MID}$=20 mm.
Figure 8C:
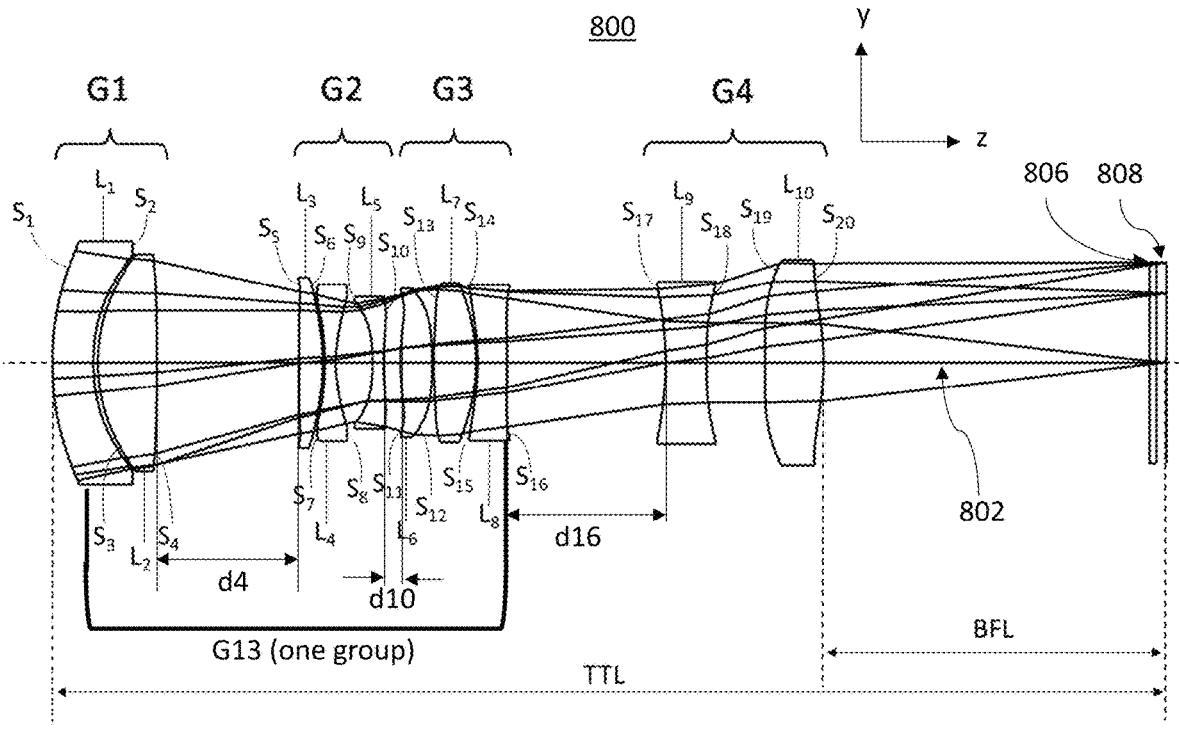
FIG. 8C shows the optical lens system of FIG. 8A in a maximum zoom state having an $EFL_{MAX}$=30 mm.

For changing ZF, G13 group is moved with a large stroke, (e.g. of 2 mm or more) with respect to G2, G4 and image sensor 178, while G2 and G4 do not move with respect to image sensor 178. As of this movement required for ZF change, camera 170 is referred to as a "G13 FCZT camera". G13 FCZT camera may include a G13 optical lens system (FIGS. 8A-C). For focusing, G1+G2+G3+G4 can be moved together as one lens with respect to image sensor 178.

Table 1 shows values and ranges of various parameters of exemplary optical lens systems numbered 600-800 and of FCZT camera module 200, which are shown and described next. These parameters include TTL, EFL, BFL, SD, $T_{Lens}$, $\Delta d$, HA, DA, $H_M$, S given in mm, Half-field-of-view ("HFOV") given in degrees, power sequence, and F/#, N, $N_{Gi}$ given without units. All of these parameters are defined above or below.

$EFL_{MIN}$ and $EFL_{MAX}$, $TTL_{MIN}$ and $TTL_{MAX}$, $BFL_{MIN}$ and $BFL_{MAX}$, $DA_{MIN}$ and $DA_{MAX}$, $F/\#_{MIN}$ and $F/\#_{MAX}$, $T_{MIN}$ and $T_{MAX}$ and $HFOV_{MIN}$ and $HFOV_{MAX}$ refer respectively to minimum and maximum EFL, TTL, BFL, DA, F/#, T and HFOV that can be achieved in the respective example. Columns "MIN" and "MAX" refer respectively to minimum and maximum values in the range of values given in the other columns.

In optical lens system examples 600 and 700, at both state $EFL_{MIN}$ and state $EFL_{MAX}$ TTL is given by $TTL_{MIN}$. $TTL_{MAX}$ is given at a particular intermediate EFL state that corresponds to the maximum in the graphs shown in FIG. 6C and FIG. 7C respectively. In optical lens system example 800, TTL at state $EFL_{MIN}$ is given by $TTL_{MIN}$, and TTL at state $EFL_{MAX}$ is given by $TTL_{MAX}$.

In optical lens system examples 600 and 700, BFL at state $EFL_{MIN}$ is given by $BFL_{MIN}$, and BFL at state $EFL_{MAX}$ is given by $BFL_{MAX}$.

The optical aperture diameter ("DA") of a lens element is given by the larger of the DA values of the front or the rear surface. In all optical lens system examples 600-800, DA at state $EFL_{MIN}$ is given by $DA_{MIN}$, and DA at state $EFL_{MAX}$ is given by $DA_{MAX}$.

The optical aperture height ("HA") of a lens element is given by the larger of the HA values of the front or the rear surface.

All values of optical lens system examples 600-800 are given for lenses without D-cut, so that $DA_{MIN}=HA_{MIN}$ and $DA_{MAX}=HA_{MAX}$.

In all optical lens system examples 600-800, the lens thickness ("$T_{Lens}$") at state $EFL_{MIN}$ is given by $T_{Lens,MIN}$, and $T_{Lens}$ at state $EFL_{MAX}$ is given by $T_{Lens,MAX}$. $HFOV_{MIN}$ is obtained at $EFL_{MAX}$ and $HFOV_{MAX}$ is obtained at $EFL_{MIN}$.

"N" represents the number of lens elements in a respective lens. "$\#N_{Gi}$" represents the number of lens elements in a respective lens group Gi.

"SD" represents the sensor diagonal.

"S" is a stroke range that represents the maximum movement of lens groups required for changing a ZF from $EFL_{MIN}$ to $EFL_{MAX}$ or vice versa.

$R=(EFL_{MAX}-EFL_{MIN})/S$ is a ratio between a ZF range determined by the EFLs in the extreme states and the stroke range S.

$T(G_i,G_{i+1})_{MIN}$ and $T(G_i,G_{i+1})_{MAX}$ represent respectively a minimum and maximum thickness of lens groups $G_i$ and $G_{i+1}$.

It is noted that a F/#, e.g. F/#$_{MAX}$, can be increased by further closing an aperture of the lens. The same is valid for a ratio F/#$_{MAX}$/F/#$_{MIN}$.

For lens power sequences, "+" indicates a positive lens power and "–" indicates a negative lens power.

TABLE 1

| Example | 600 | 700 | 800 | MIN | MAX |
|---|---|---|---|---|---|
| Type | G24 | G24 | G13 | | |
| N | 10 | 10 | 10 | 10 | 10 |
| $EFL_{MIN}$ | 9.61 | 9.96 | 9.99 | 9.61 | 9.99 |
| $EFL_{MAX}$ | 24.03 | 27 | 29.87 | 24.03 | 29.87 |
| SD | 5.1 | 5.1 | 5.1 | 5.10 | 5.10 |
| $TTL_{MIN}$ | 25.07 | 29.34 | 29.52 | 25.07 | 29.52 |
| $TTL_{MAX}$ | 25.31 | 29.99 | 33.22 | 25.27 | 33.22 |
| $BFL_{MIN}$ | 1.47 | 2.71 | 10.22 | 1.47 | 10.22 |
| $BFL_{MAX}$ | 5.16 | 7.93 | 10.22 | 5.16 | 10.22 |
| $DA_{MIN}$ | 4.07 | 3.85 | 2.95 | 2.95 | 4.07 |
| $DA_{MAX}$ | 5.17 | 5.79 | 6.69 | 5.17 | 6.69 |
| $HA_{MIN}$ | 4.07 | 3.85 | 2.95 | 2.95 | 4.07 |
| $HA_{MAX}$ | 5.17 | 5.79 | 6.69 | 5.17 | 6.69 |
| F/#$_{MIN}$ | 2.36 | 2.59 | 3.38 | 2.36 | 3.38 |
| F/#$_{MAX}$ | 4.64 | 4.66 | 4.46 | 4.46 | 4.66 |
| $\Delta d$ | 0.23 | 0.66 | 3.70 | 0.23 | 3.70 |
| $S_{G24}$ | 3.69 | 5.21 | 0.00 | 0.00 | 5.21 |
| $S_{G13}$ | 0.23 | 0.66 | 3.70 | 0.23 | 3.70 |
| Lens power sequence | (+–)(––)(+++)(+–+) | (+–)(–+)(+–+)(+–+) | (–+)(+––)(++–)(–+) | | |
| Lens group power sequence | +–++ | +–++ | +–++ | | |
| $T_{Lens,MIN}$ | 19.912 | 21.410 | 19.296 | 19.30 | 21.41 |
| $T_{Lens,MAX}$ | 23.600 | 26.623 | 22.999 | 23.00 | 26.62 |
| $N_{G1}$ | 2 | 2 | 2 | 2 | 2 |
| $N_{G2}$ | 2 | 2 | 3 | 2 | 3 |
| $N_{G3}$ | 3 | 3 | 3 | 3 | 3 |
| $N_{G4}$ | 3 | 3 | 2 | 2 | 3 |
| $EFL_{G1}$ | 19.27 | 17.82 | 16.10 | 16.10 | 19.27 |
| $EFL_{G2}$ | –5.81 | –5.62 | –3.96 | –5.81 | –3.96 |
| $EFL_{G3}$ | 6.02 | 7.15 | 5.59 | 5.59 | 7.15 |
| $EFL_{G4}$ | 14.24 | 305.70 | 154.50 | 14.24 | 305.70 |
| $T_{G1}$ | 2.25 | 1.50 | 3.11 | 1.50 | 3.11 |
| $T_{G2}$ | 1.25 | 1.91 | 2.60 | 1.25 | 2.60 |
| $T_{G3}$ | 5.49 | 5.01 | 3.25 | 3.25 | 5.49 |
| $T_{G4}$ | 5.68 | 4.97 | 4.96 | 4.96 | 5.68 |
| $HFOV_{MIN}$ | 6.06 | 5.36 | 5.62 | 5.36 | 6.06 |
| $HFOV_{MAX}$ | 13.97 | 14.63 | 17.02 | 13.97 | 17.02 |
| $H_M$ | 6.20 | 6.20 | 6.20 | 6.20 | 6.20 |
| $EFL_{MAX}/EFL_{MIN}$ | 2.50 | 2.71 | 2.99 | 2.50 | 2.99 |
| F/#$_{MAX}$/F/#$_{MIN}$ | 1.97 | 1.80 | 1.32 | 1.32 | 1.97 |
| $DA_{MIN}/DA_{MAX}$ | 0.79 | 0.66 | 0.44 | 0.44 | 0.79 |
| $TTL_{MIN}/TTL_{MAX}$ | 0.99 | 0.98 | 0.89 | 0.89 | 0.99 |
| $TTL_{MAX}/EFL_{MAX}$ | 1.05 | 1.11 | 1.11 | 1.05 | 1.11 |
| $S_{G24}/S_{G13}$ | 15.95 | 7.94 | 0.00 | 0.00 | 15.95 |
| R | 3.91 | 3.27 | 5.37 | 3.27 | 5.37 |
| $\Delta d/T_{Lens,Min}$ | 0.012 | 0.030 | 0.192 | 0.012 | 0.192 |
| $\Delta d/T_{Lens,Max}$ | 0.010 | 0.025 | 0.161 | 0.010 | 0.161 |
| $T(G1,G2)_{MIN}$ | 1.25 | 1.50 | 2.60 | 1.25 | 2.60 |
| $T(G1,G2)_{MAX}$ | 2.25 | 1.91 | 3.11 | 1.91 | 3.11 |
| $T(G3,G4)_{MIN}$ | 5.49 | 4.97 | 3.25 | 3.25 | 5.49 |
| $T(G3,G4)_{MAX}$ | 5.68 | 5.01 | 4.96 | 4.96 | 5.68 |
| $T(G1,G2)_{MIN}/T(G1,G2)_{MAX}$ | 0.56 | 0.78 | 0.84 | 0.56 | 0.84 |
| $T(G3,G4)_{MIN}/T(G3,G4)_{MAX}$ | 0.97 | 0.99 | 0.66 | 0.66 | 0.99 |
| $T(G1,G2)_{MAX}/T(G3,G4)_{MIN}$ | 0.41 | 0.39 | 0.96 | 0.39 | 0.96 |

In particular, in embodiments disclosed herein, the following ranges are supported:

$$EFL_{MIN} \geq 9.00 \text{ mm};$$

$$24.00 \text{ mm} \leq EFL_{MAX} \leq 30 \text{ mm};$$

$$EFL_{MIN} \leq EFL \leq EFL_{MAX};$$

$$5.00 \text{ mm} < DA_{MAX} < 7.00 \text{ mm};$$

$$2.30 \leq F/\#_{MIN} < 4.00, 4.40 < F/\#_{MAX} < 6;$$

$$2.50 \leq EFL_{MAX}/EFL_{MIN} \leq 2.99;$$

$$1.30 \leq F/\#_{MAX}/F/\#_{MIN} \leq 3.00.$$

Figure 2A:
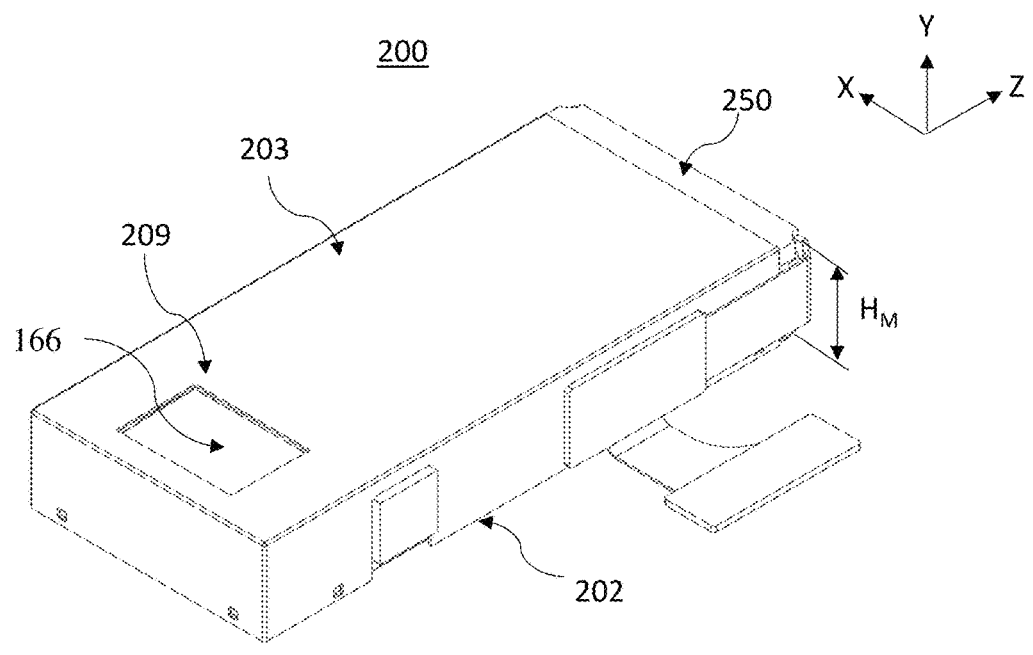
FIG. 2A shows an embodiment of a G24 FCZT camera module disclosed herein in a perspective view.
Figure 2B:
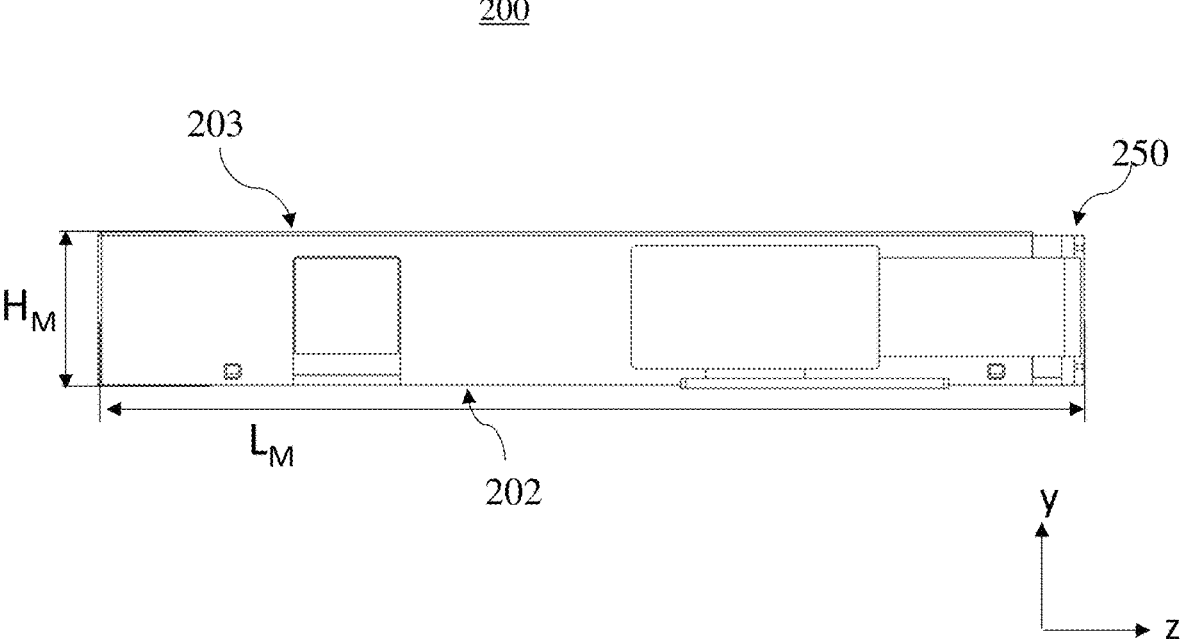
FIG. 2B shows the camera module of FIG. 2A in a side view.
Figure 2C:
FIG. 2C shows the camera module of FIG. 2A in a first exploded view.

FIG. 2A shows yet another embodiment of a FCZT camera module disclosed herein and numbered 200 in a perspective view. FIG. 2B shows camera module 200 in a side view. FIG. 2C shows camera module 200 in a first exploded view, and FIG. 2D shows camera module 200 in a second exploded view.

Figure 2D:
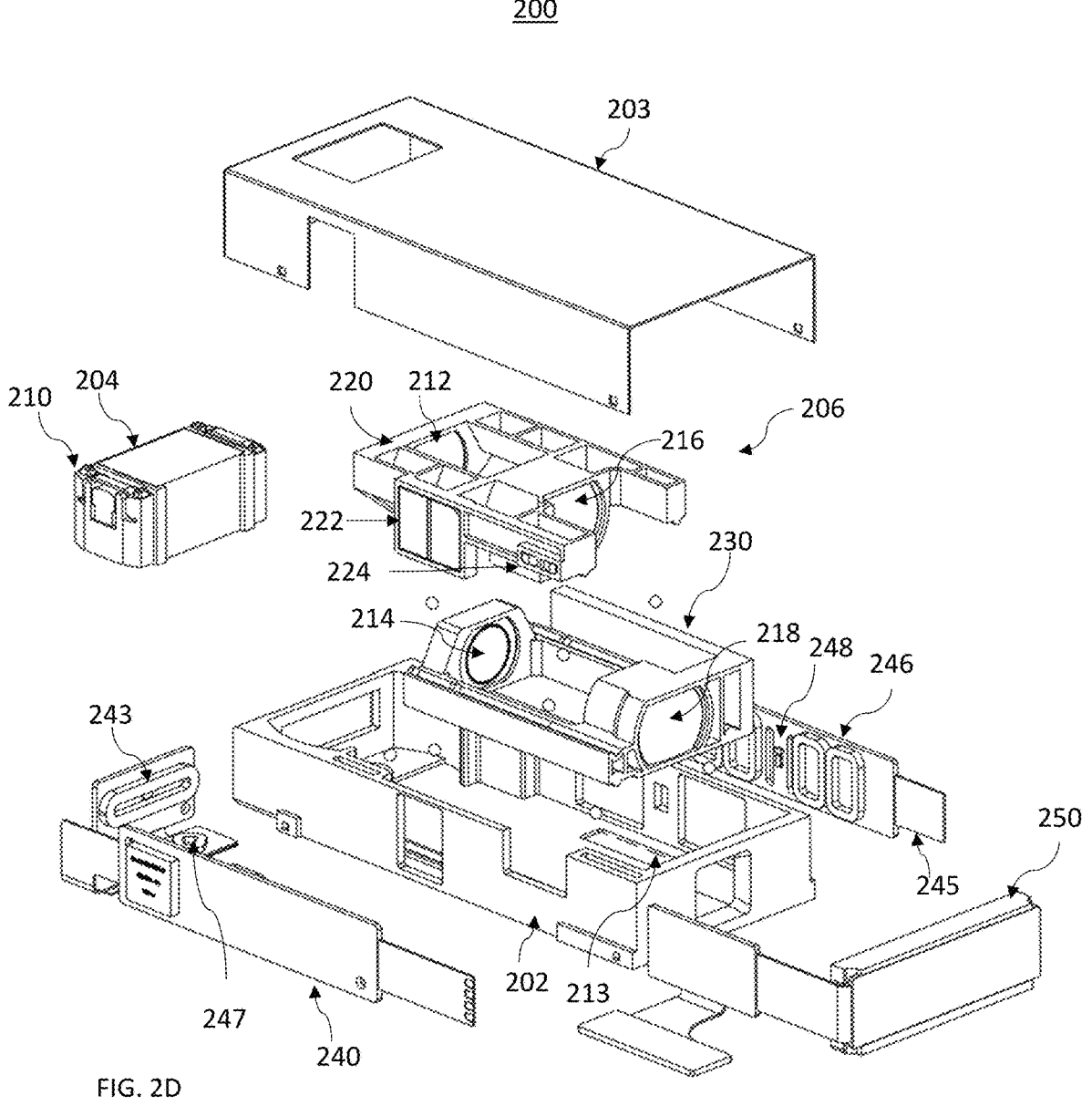
FIG. 2D shows the camera module of FIG. 2A in a second exploded view.

Camera module 200 comprises an OPFE module 210 with an OPFE 204 (e.g. a prism) that folds the light from OP1 to OP2, and a lens 206 divided into four lens groups G1-G4 included in four lens barrel sections (the barrel sections named after the group number), respectively G1 barrel 212, G2 barrel 214, G3 barrel 216 and G4 barrel 218 (see FIGS. 2C-D). Camera module 200 further comprises a housing 202, a top shield 203, a first flex 240 (e.g. a flexible printed circuit board or "flex PCB"), a second flex 245 (e.g. a flex PCB), a sensor module 250 that includes an image sensor 208, and an optional optical element (not shown). Housing 202 includes a first yoke 213 and a second yoke 215 (see e.g. FIG. 4B). Flex 240 additionally includes a pitch coil 243 and two yaw coils, a first yaw coil 245 and a second yaw coil 247.

G1 barrel 212 and G3 barrel 216 are included in a "G13 carrier" 220, and G2 barrel 214 and G4 barrel 218 are included in a "G24 carrier" 230. The two barrels included in each of G13 carrier 220 and G24 carrier 230 do not move with respect to each other, but only with respect to the two barrels included in the other of G24 carrier 230 and in G13 carrier 220, as well as with respect to image sensor 208. Flex 240 includes a coil 242 and a position sensor 225 (FIG. 4H), e.g. a Hall sensor. G13 carrier 220 includes an "actuation" magnet 222 and a "position" magnet 224 that form, together with coil 242 and position sensor 225, a "G13 carrier VCM" that actuates G13 carrier 220 with respect to image sensor 208. G13 carrier VCM is a closed-loop VCM. Actuation magnet 222 and coil 242 form an actuation unit, and position magnet 224 and position sensor 225 form a position sensing unit. The actuation of G13 carrier 220 with respect to image sensor 208 may be along the optical axis of lens 206 and over a relatively small stroke of 0.5 mm-5 mm. In the example shown, the actuation of G13 carrier 220 is over a stroke of about 1.7 mm. Flex 245 includes a coil assembly ("CA") 246 and a Hall sensor 248. CA 246 may include 2 or more coils. G24 carrier 230 includes a magnet assembly ("MA") of three or more magnets which forms, together with CA 246 and Hall sensor 248, a "G24 carrier VCM" that actuates G24 carrier 230 with respect to image sensor 208. The G24 carrier VCM may additionally include a position sensing unit for controlling an actuation of G24 carrier 230 with respect to image sensor 208. G24 carrier VCM" is a "large stroke" VCM for performing large stroke movements as described above or below, as e.g. described in PCT/IB2021/056693. G24 carrier VCM is a closed-loop VCM.

The actuation of G24 carrier 230 with respect to image sensor 208 may be along the optical axis of lens 206 and over a relatively large stroke of 2.0 mm-15 mm. In the example shown, the actuation of G24 carrier 230 is over a stroke of about 6.2 mm. Because the G24 carrier moves along a relatively large stroke and the G13 carrier moves along a relatively small stroke, camera module 200 is referred to as a "G24 FCZT camera module". A G24 FCZT camera module may include a G24 FCZT camera (FIGS. 1B-C).

Camera module 200 has a module height $H_M$ and includes a camera aperture 209 with an aperture height $H_A$. Module height $H_M$ and aperture height $H_A$ are both measured along the Y-axis in the coordinate system shown in FIG. 2B (i.e., along OP1). Aperture height $H_A$ is determined by the optical height ("$H_L$"—see FIG. 6A) of the lens element that determines an aperture stop of camera 200. For example, $H_M$ may be 6.2 mm and $H_A$ may be 5.0 mm. In general, $H_M$ may be in the range $H_M$=5 mm-15 mm and $H_A$ may be in the range $H_A$=3 mm-10 mm. Module length $L_M$ may be about 40 mm, in general 25 mm-60 mm.

Figure 5A:
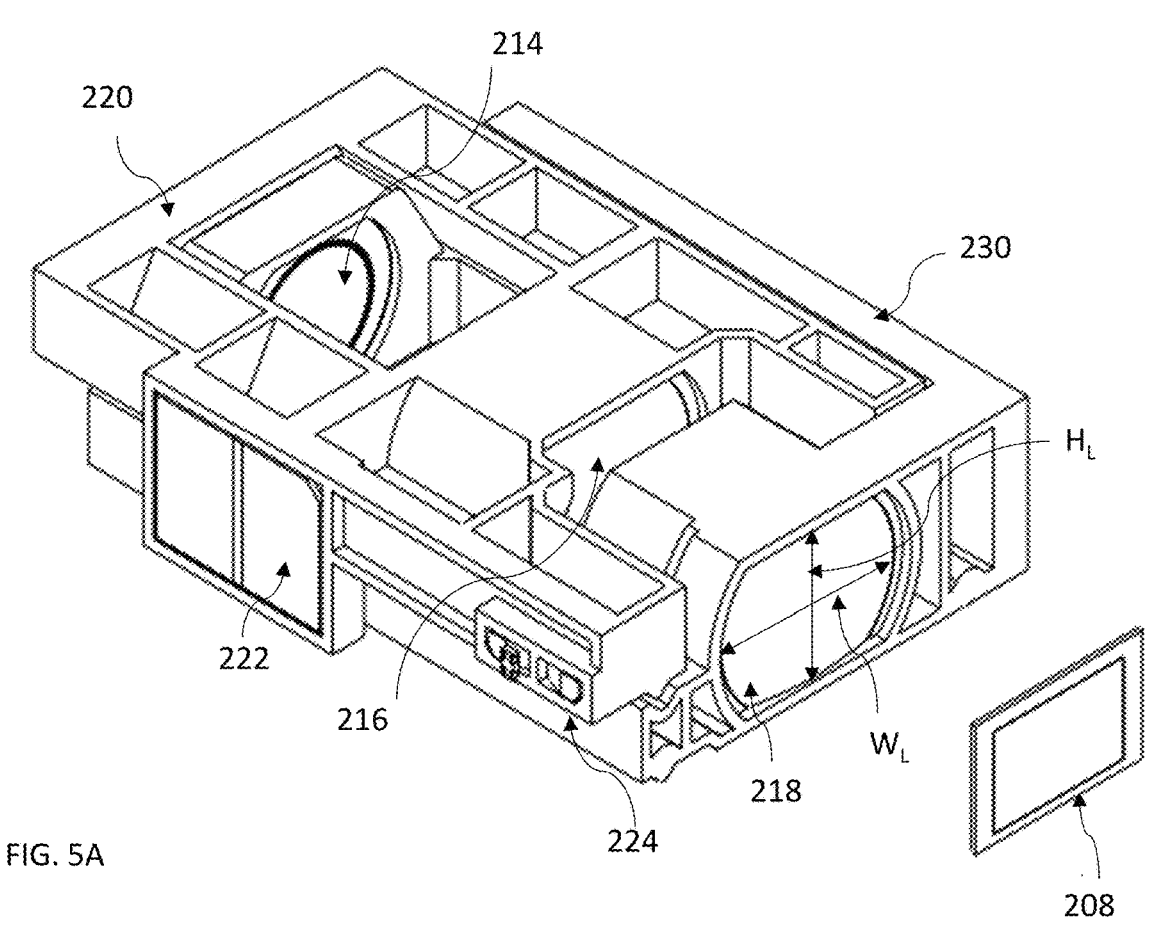
FIG. 5A shows components of the FCZT camera module of FIGS. 2A-2D in a minimum zoom state in a perspective view.

Lens 206 may be a "cut" (or "D-cut") lens as known in the art and shown in FIG. 2E, which shows a cut lens 260. Cut lens 260 is cut along an axis parallel to the x axis at the sides marked 262 and 264. At the sides marked 266 and 268, lens 260 is not cut. Therefore, lens 260 has an optical lens width $W_L$ (measured along the x axis) which is larger than its optical lens height $H_L$ (measured along the Y-axis). Using a cut lens such as lens 260 is beneficial in folded cameras, as it supports slim camera height while still providing a relatively large aperture area (AA) of AA>$H_L^2$ and AA>$(H_L/2)^2 \cdot \pi$. For a lens element that determines the aperture of a camera, the optical lens height and width is equivalent to the height and the width of the aperture of the lens, i.e. $H_L$=$H_A$ and $W_L$=$W_A$. G4 included in G4 barrel 218 may be cut, meaning that $W_A$>$H_A$ is fulfilled, as shown in FIG. 5A.

A cut lens has one or more lens elements Li that are cut, i.e. that have an optical width ("$W_{Li}$") measured along a first axis perpendicular to the lens optical axis that is larger than an optical height ("$H_{Li}$") measured along a second axis perpendicular to the lens optical axis, i.e. $W_{Li}$>$H_{Li}$. For example, a D-cut ratio of a cut lens may be 0%-50%, meaning that $W_{Li}$ may be larger than $H_{Li}$ by 0%-50%, i.e. The cutting may reduce module height $H_M$ of the camera module above. This allows to realize a slim FCZT camera having a low $H_M$ to render it compatible with smartphone size constraints and having a relatively large aperture area, which is beneficial for achieving a low F/# camera having a relatively large signal-to-noise ratio ("SNR"). One may refer to the difference between $H_M$ and $H_A$ as a "height penalty" ("P") of the camera module, where P is to be minimized for a slim camera with relatively large SNR. Further design choices for minimizing penalty P are:

Top shield 203 may be made of metal and may have a low height (measured along the y-axis) or thickness of about 0.05 mm-0.25 mm, and in particular about 0.1 mm-0.2 mm.

Yoke 213 and Yoke 215 are located at a bottom part of housing 202 with lowest height (measured along the Y-axis) or thickness. Yoke 213 and Yoke 215 may be made of a magnetic metal and may have a low height of about 0.05 mm-0.25 mm.

A height of G13 carrier 220 and G24 carrier 230 is determined by $H_L$. That is, G13 carrier 220 and G24 carrier 230 do not include any additional parts that have a height that exceeds the height of a G1 barrel 212, a G2 barrel 214, G3 barrel 216 and G4 barrel 218. For example, the height of G1 barrel 212 is given by the sum of $H_L$ and twice the G1 barrel thickness of e.g. 0.1 mm-0.5 mm.

$H_M$ is determined by the heights of G13 carrier 220 and G24 carrier 230. $H_M$ is given by a largest height of G13 carrier 220 or G24 carrier 230 plus two thin air gaps having an air gap height of about 0.1 mm (a first air gap being located between G13 carrier 220 and top shield 203, a second air gap being located between G13 carrier 220 and housing 202) plus the thickness of top shield 203 and plus the thickness of housing 202.

Prism 204 may be a cut prism as known in the art, as shown exemplarily in FIG. 2F, which shows a cut prism numbered 270. Cut prism 270 is cut along an axis parallel to the x axis at the side marked 274. At the side marked 272, prism 270 is not cut. As shown, an optical width of cut prism 270 ("$W_P$", measured along the x axis) is larger than an optical height of cut prism 270 ("$H_P$", measured along the Y-axis) by 0%-50% (this representing a D-cut ratio). A cut prism may be beneficial for obtaining a slim camera having a low camera height that still lets in a relatively large amount of light.

Figure 3A:
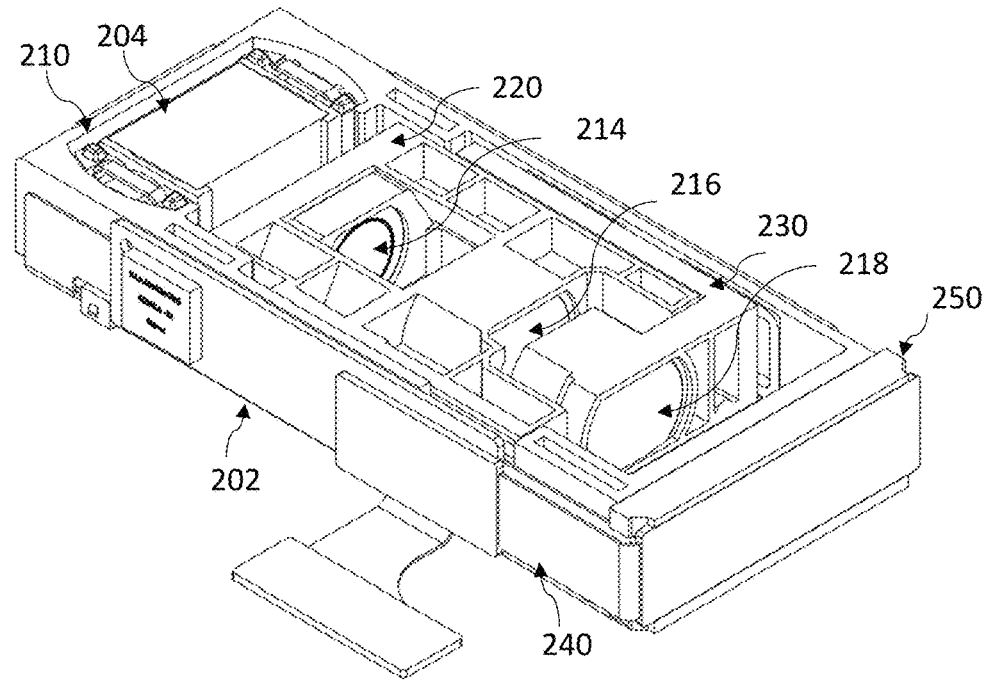
FIG. 3A shows the camera module of FIG. 2A in a perspective view and without a top shield.
Figure 3B:
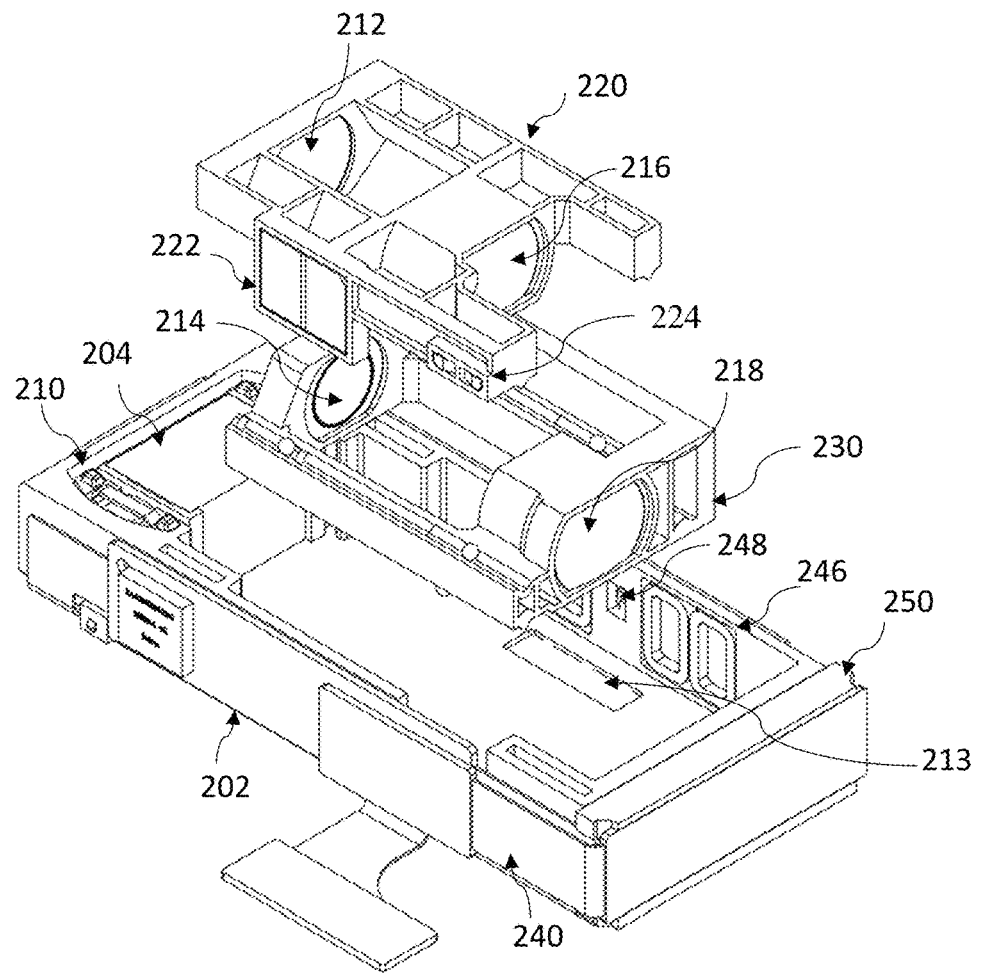
FIG. 3B shows the camera module of FIG. 2A without the top shield from FIG. 3A in an exploded view.

FIG. 3A shows camera module 200 from FIGS. 2A-2D in a perspective view and without top shield 203. FIG. 3B shows camera module 200 without top shield 203 from FIG. 3A in an exploded view.

Figures 4A, 4B:
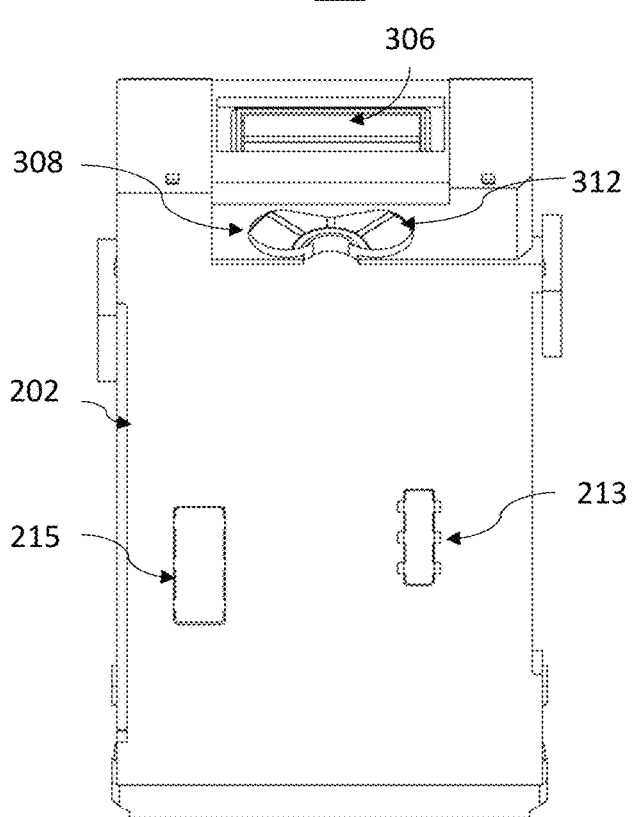
FIG. 4A shows the camera module of FIG. 2A-2D in a bottom view and with a flex partly removed for exposing a pitch coil, a pitch position sensor, two yaw coils and a yaw position sensor.
FIG. 4B shows the camera module of FIG. 2A-2D in a bottom view with some of the elements shown in FIG. 4A removed.

FIG. 4A shows camera module 200 in a bottom view and with flex 240 partly removed for exposing pitch coil 243, pitch position sensor 302 as well as two yaw coils 245 and 247 and yaw position sensor 304. Yoke 213 and yoke 215 are visible.

FIG. 4B shows camera module 200 in a bottom view and with flex 240 as well as pitch coil 243, pitch position sensor 302, yaw coils 245 and 247 and yaw position sensor 304 partly removed for exposing pitch magnet 306 as well as two yaw magnets 308 and 312. Pitch coil 243, pitch position sensor 302 and pitch magnet 306 form together a, "first OIS VCM" for performing optical image stabilization (OIS) around a first OIS rotation axis. Yaw coils 245 and 247, yaw position sensor 304 and yaw magnets 308 and 312 form together a "second OIS VCM" for performing OIS around a second OIS rotation axis. First OIS rotation axis is perpendicular to both OP1 and OP2, second OIS rotation axis is parallel to OP1.

Figure 4C:
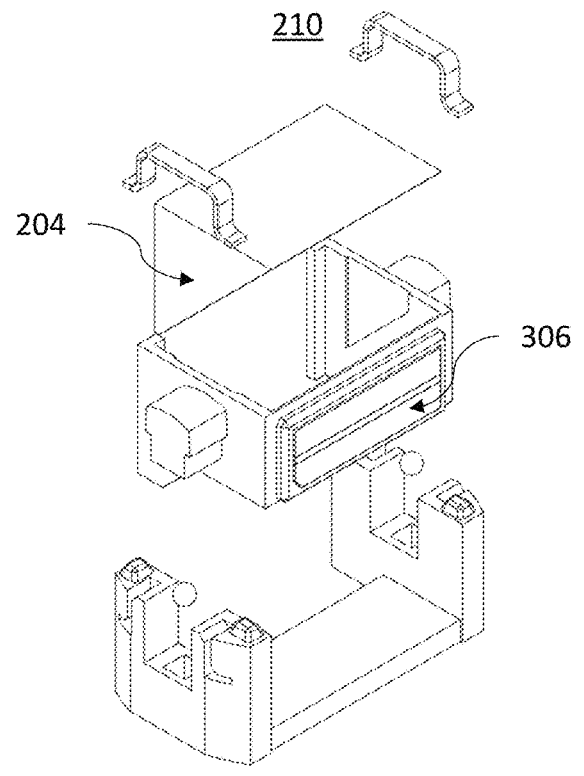
FIG. 4C shows an OPFE module in the camera module of FIG. 2A-2D in a perspective top view.
Figure 4D:
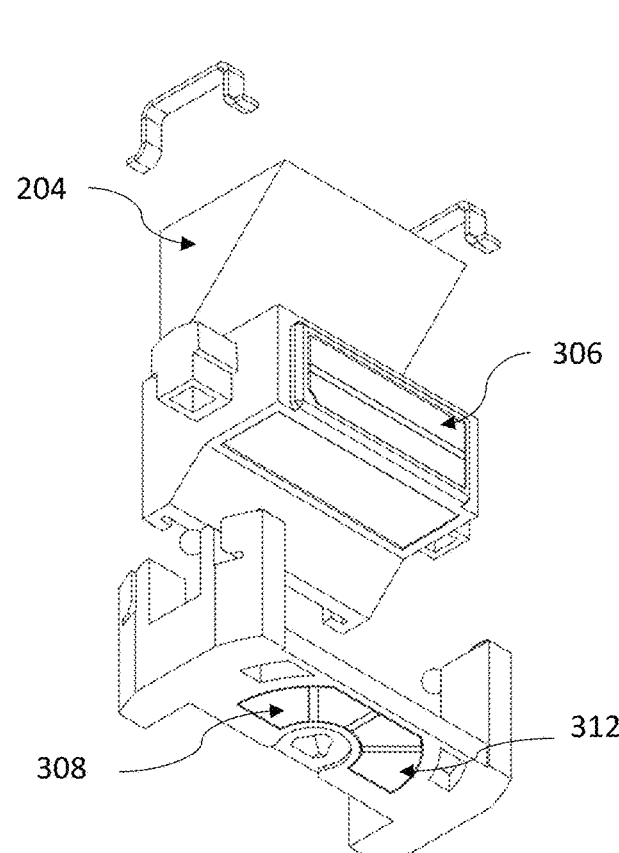
FIG. 4D shows the OPFE module of FIG. 4C in a perspective bottom view.

FIG. 4C shows OPFE module 210 in a perspective top view. FIG. 4D shows OPFE module 210 in a perspective bottom view.

Figure 4E:
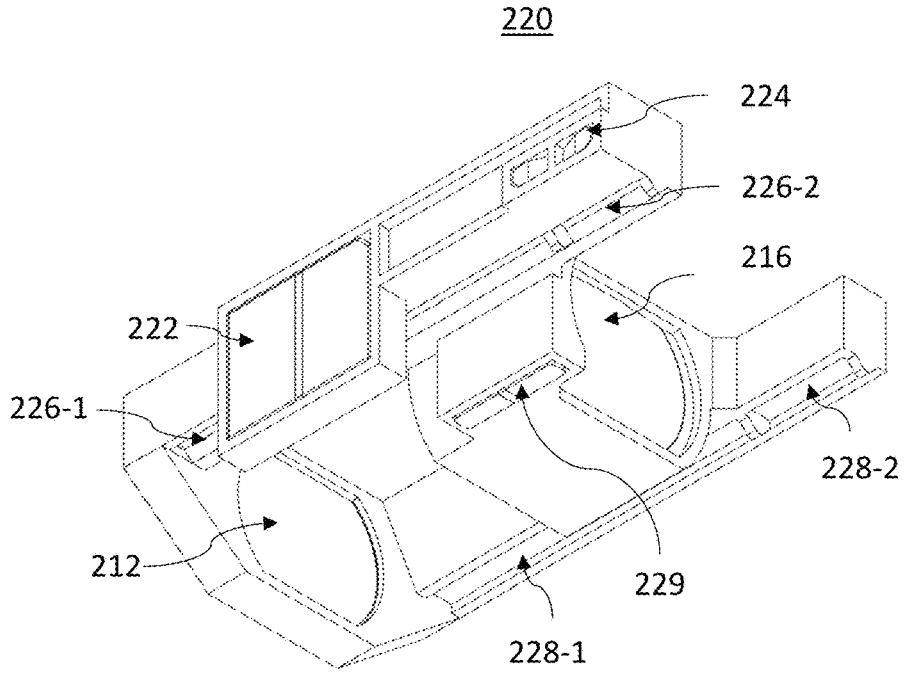
FIG. 4E shows a G13 carrier in the camera module of FIG. 2A-2D in a perspective bottom view.

FIG. 4E shows G13 carrier 220 in a perspective bottom view.

Figure 4F:
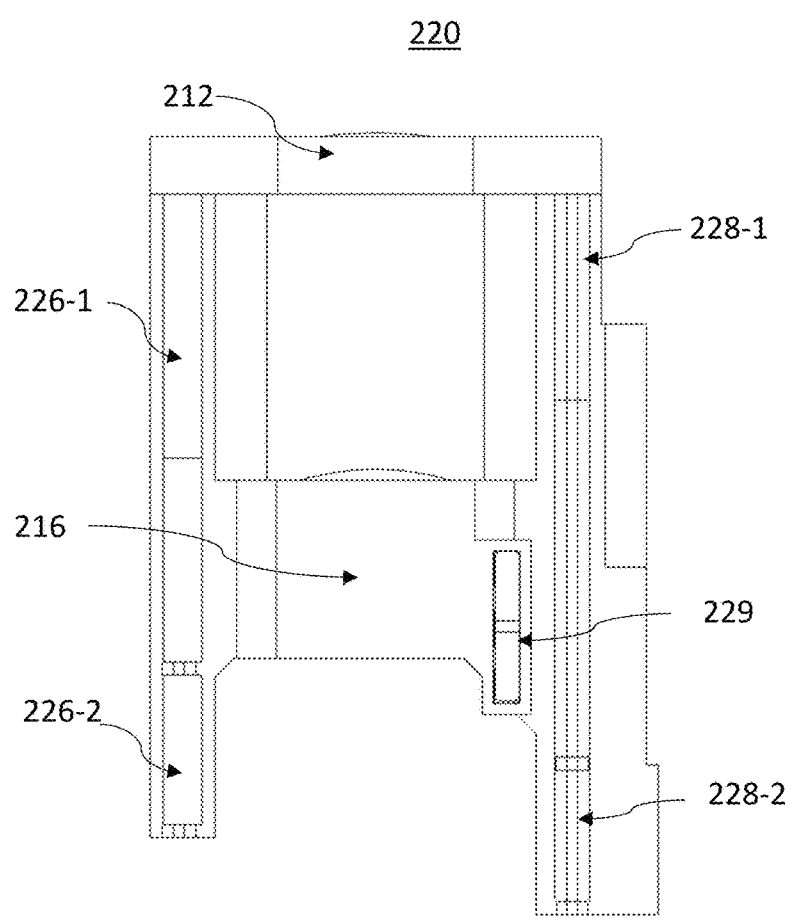
FIG. 4F shows the G13 carrier of FIG. 4E in a bottom view.

FIG. 4F shows G13 carrier 220 in a bottom view. G13 carrier 220 includes a preload magnet 229 which is attracted to yoke 215. G13 carrier 220 additionally includes two grooved rails 228-1 and 228-2 and two flat rails 226-1 and 226-2.

Figure 4G:
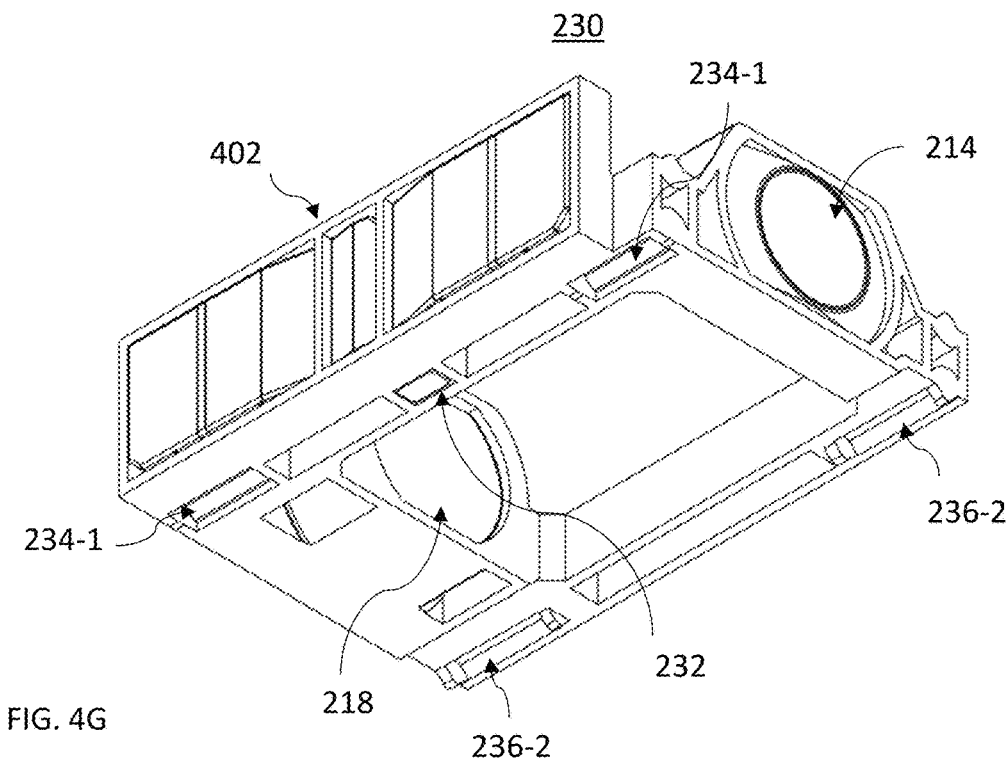
FIG. 4G shows a G24 carrier in the camera module of FIG. 2A-2D in a perspective top view.

FIG. 4G shows G24 carrier 230 in a perspective top view. G24 carrier 230 includes a preload magnet 232 which connects to yoke 213. G24 carrier 230 additionally includes two grooved rails 234-1 and 234-2 and two grooved rails 236-1 and 236-2 and magnet assembly 402.

Grooved rails 234-1, 234-2, 236-1 and 236-2 in G24 carrier 230 and grooved rails 226-1 and 226-2 and flat rails 228-1 and 228-2 in G13 carrier 220 include balls, so that they form ball-groove mechanisms that allow G13 carrier 220 to move on top of and relative to G24 carrier 230 and relative to image sensor 208 by means of G13 carrier VCM.

G24 carrier 230 moves relative to G13 carrier 220 and relative to image sensor 208 by means of G24 carrier VCM.

Figure 4H:
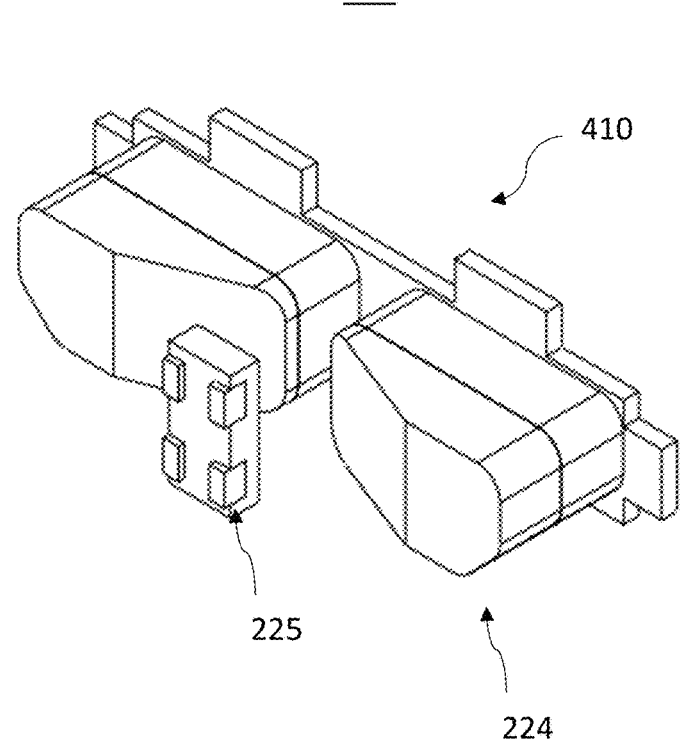
FIG. 4H shows a position magnet included in the G13 carrier and a position sensor included in the flex in a perspective view.

FIG. 4H shows position magnet 224 included in G13 carrier 220 in a perspective view. Position sensor 225 included in flex 240 is also shown. Together, position magnet 224 and position sensor 225 form a position sensing unit 410 that controls the actuation of G13 carrier 220. Position sensing unit 410 is a large stroke position sensing unit as known in the art and e.g. described in PCT/IB2021/056693.

FIG. 5A shows components of FCZT camera module 200 in a minimum zoom state in a perspective view. In this example, in the minimum zoom state with $ZF_{MIN}$, $EFL_{MIN}$ may be ≥9 mm and a minimal F/#may be $F/\#_{MIN} \geq 2.3$. G4 included in G4 barrel 218 may be a cut (or D-cut) lens as known in the art, i.e. G4 may have an optical lens width ($W_L$) and an optical lens height ($H_L$) that fulfill $W_L > H_L$. In other examples, further lens groups or all lens groups may be D-cut.

Figure 5B:
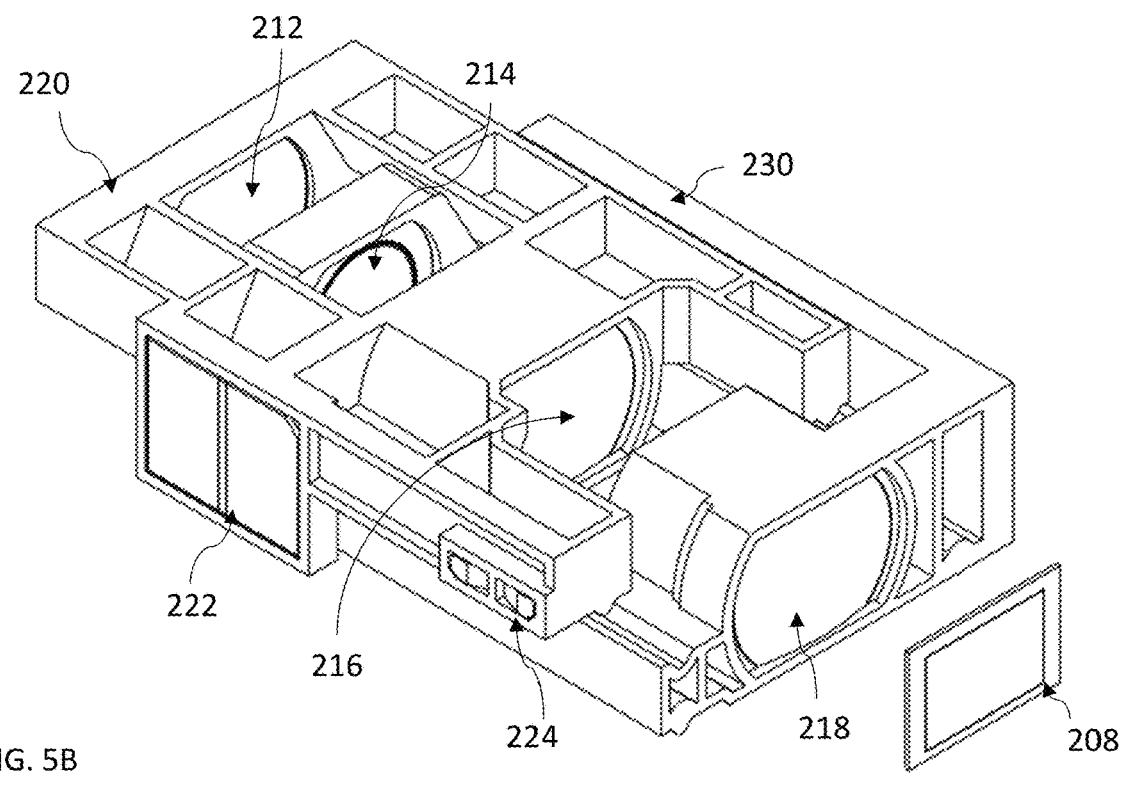
FIG. 5B shows components of the FCZT camera module of FIGS. 2A-2D in an intermediate zoom state in a perspective view.

FIG. 5B shows components of FCZT camera module 200 in an intermediate zoom state in a perspective view. In this intermediate zoom state having some zoom factor $ZF_{INT}$, an $EFL_{INT}$ may be 16 mm.

Figure 5C:
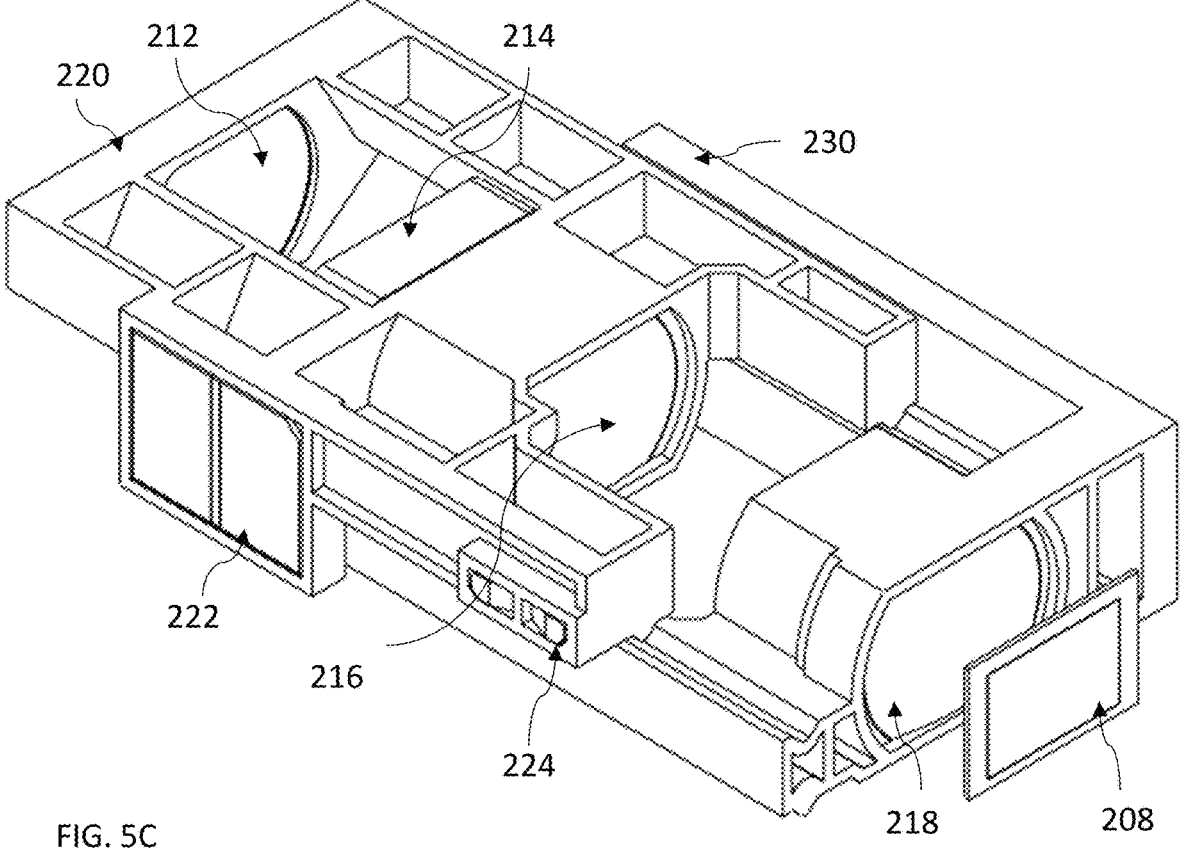
FIG. 5C shows components of the FCZT camera module of FIGS. 2A-2D in a maximum zoom state in a perspective view.

FIG. 5C shows components of FCZT camera module 200 in a maximum zoom state in a perspective view. In this example, in the maximum zoom state having a maximum zoom factor $ZF_{MAX}$, an $EFL_{MAX}$ may be 24 mm-30 mm and a maximal F/# may be $F/\#_{MAX} < 6$.

In a "G13 FCZT camera module" including a G13 FCZT camera (FIGS. 1D-E), the G13 carrier moves along a relatively large stroke and the G24 carrier moves along a relatively small stroke. Based on G24 FCZT camera module 200, a G13 FCZT camera module may be realized by exchanging G24 carrier VCM and G13 carrier VCM, i.e. the large stroke G24 carrier VCM may be used to actuate a G13 carrier such as G13 carrier 220 over a relatively large stroke, and the G13 carrier VCM may be used to actuate a G24 carrier such as G24 carrier 230 over a relatively small stroke. In the G13 FCZT camera module, a yoke that attracts G24 carrier 230 such as yoke 213 and a yoke that attracts G13 carrier 220 such as yoke 215 respectively may be located at positions different than the ones shown for G24 FCZT camera module 200.

FIGS. 6A-6B show a G24 optical lens system disclosed herein and numbered 600 which may be included into a G24 FCZT camera like camera 160. FIG. 6A shows optical lens system 600 in a first, minimal zoom state having an $EFL_{MIN}$=9.6 mm. FIG. 6B shows optical lens system 600 in a second, maximum zoom state having an $EFL_{MAX}$=24.0 mm. The transition or switching from $EFL_{MAX}$ to $EFL_{MIN}$ or vice versa can be performed continuously, i.e. a FCZT camera such as FCZT camera 160 including system 600 can be switched to any other EFL that satisfies $EFL_{MIN} \leq EFL \leq EFL_{MAX}$.

Optical lens system 600 comprises a lens 604 having a lens optical axis 602, an (optional) optical element 606 and an image sensor 608. System 600 is shown with ray tracing. Optical element 606 may be for example an infra-red (IR) filter, and/or a glass image sensor dust cover. Like lens 164, lens 604 is divided into four lens groups G1, G2, G3 and G4. G1 includes (in order from an object to an image side of optical system 600) lens elements L1-L2, G2 includes L3-L4, G3 includes L5-L7 and G4 includes L8-L10. The lens elements included in each lens group are fixedly coupled to each other. Distances between the lens groups are marked d4 (between G1 and G2), d8 (between G2 and G3), d14 (between G3 and G4) and d20 (between G4 and optical element 606). Lens 604 includes a plurality of N lens elements $L_i$. In lens 604, N=10. $L_1$ is the lens element closest to the object side and $L_N$ is the lens element closest to the image side, i.e. the side where the image sensor is located. This order holds for all lenses and lens elements disclosed herein. Each lens element $L_i$ comprises a respective front surface $S_{2i-1}$ (the index "2i−1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N.

It is noted that G24 optical lens system 600 as well as all other optical lens systems disclosed herein are shown without D-cut.

Detailed optical data and surface data for system 600 are given in Tables 2-4. The values provided for these examples are purely illustrative and according to other examples, other values can be used.

Surface types are defined in Table 2. "Stop" in the Comment column of Table 2 indicates where the aperture stop of the lens is located. The coefficients for the surfaces are defined in Table 4. The surface types are:

a) Plano: flat surfaces, no curvature b) Q type 1 (QT1) surface sag formula:

$$z(r) = \frac{cr^2}{1 + \sqrt{1 - (1 + k)c^2 r^2}} + D_{con}(u) \tag{Eq. 1}$$

$$D_{con}(u) = u^4 \sum_{n=0}^{N} A_n Q_n^{con}(u^2)$$

16

-continued $$u = \frac{r}{r_{norm}}, x = u^2$$

$$Q_0^{con}(x) = 1$$

$$Q_1^{con} = -(5 - 6x)$$

$$Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

c) Even Asphere (ASP) surface sag formula:

$$z(r) = \frac{cr^2}{1 + \sqrt{1 - (1 + k)c^2 r^2}} + \tag{Eq. 2}$$

$$\alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where {z, r} are the standard cylindrical polar coordinates, c is the paraxial curvature of the surface, k is the conic parameter, $r_{norm}$ is generally one half of the surface's clear aperture, and An are the polynomial coefficients shown in lens data tables. The Z axis is positive towards image. Values for optical lens diameter D are given as a clear aperture radius, i.e. D/2. The reference wavelength is 555.0 nm. Units are in mm except for refraction index ("Index") and Abbe #. The FOV is given as half FOV (HFOV). The definitions for surface types, Z axis, CA values, reference wavelength, units, focal length and HFOV are valid for all further presented tables.

TABLE 2

| | | | | | Optical lens system 600 | | | | |
|---|---|---|---|---|---|---|---|---|---|
| Surface # | Comment | Type | Curvature Radius | Thickness | Aperture Radius (D/2) | Material | Index | Abbe # | Focal Length |
| 1 | Lens 1 | ASP | 7.450 | 1.153 | 3.052 | Plastic | 1.54 | 55.93 | 11.32 |
| 2 | | | −34.276 | 0.172 | 2.947 | | | | |
| 3 | Lens 2 | ASP | 45.190 | 0.633 | 2.778 | Plastic | 1.64 | 23.52 | −24.24 |
| 4 | | | 11.541 | See Table 3 | 2.532 | | | | |
| 5 | Lens 3 - Stop | ASP | −20.726 | 0.330 | 1.744 | Plastic | 1.53 | 55.69 | −8.57 |
| 6 | | | 5.941 | 0.268 | 1.787 | | | | |
| 7 | Lens 4 | ASP | −24.974 | 0.330 | 1.820 | Plastic | 1.54 | 55.93 | −19.01 |
| 8 | | | 17.846 | See Table 3 | 1.859 | | | | |
| 9 | Lens 5 | ASP | 9.996 | 1.081 | 3.044 | Plastic | 1.54 | 55.93 | 14.22 |
| 10 | | | −33.512 | 0.050 | 3.052 | | | | |
| 11 | Lens 6 | ASP | 3.419 | 1.515 | 3.000 | Plastic | 1.53 | 55.69 | 46.94 |
| 12 | | | 3.344 | 0.783 | 2.665 | | | | |
| 13 | Lens 7 | ASP | 4.078 | 1.753 | 2.558 | Plastic | 1.54 | 55.93 | 11.42 |
| 14 | | | 9.992 | See Table 3 | 2.371 | | | | |
| 15 | Lens 8 | ASP | −24.642 | 0.805 | 2.357 | Plastic | 1.54 | 55.93 | 18.31 |
| 16 | | | −7.196 | 0.170 | 2.385 | | | | |
| 17 | Lens 9 | ASP | −3.838 | 0.740 | 2.354 | Plastic | 1.61 | 25.59 | −4.67 |
| 18 | | | 12.572 | 1.919 | 2.510 | | | | |
| 19 | Lens 10 | ASP | 20.787 | 1.753 | 2.943 | Plastic | 1.54 | 55.93 | 6.59 |
| 20 | | | −4.225 | See Table 3 | 3.052 | | | | |
| 21 | Filter | Plano | Infinity | 0.179 | — | Glass | 1.52 | 64.17 | |
| 22 | | | Infinity | 0.255 | — | | | | |
| 23 | Image | Plano | Infinity | — | — | | | | |

EFL = see Table 3,

F number (F/#) = see Table 3,

HFOV = see Table 3.

17

TABLE 3

|  | EFL = 9.61 | EFL = 24.03 |
|---|---|---|
| Surface 4 | 0.911 | 4.599 |
| Surface 8 | 4.251 | 0.563 |
| Surface 14 | 1.296 | 4.984 |
| Surface 20 | 4.729 | 1.041 |
| F/# | 2.36 | 4.64 |
| HFOV [deg] | 13.97 | 6.06 |

TABLE 4

| Aspheric Coefficients | | | | |
|---|---|---|---|---|
| Surface # | Conic | A4 | A6 | A8 |
| 1 | 0 | -3.70E-04 | -5.26E-06 | 8.06E-06 |
| 2 | 0 | -2.58E-03 | 4.80E-04 | -1.90E-05 |
| 3 | 0 | -2.11E-03 | 4.44E-04 | -2.96E-05 |
| 4 | 0 | 4.81E-04 | -2.21E-05 | -4.56E-06 |
| 5 | 0 | -6.37E-03 | -4.24E-04 | 1.71E-04 |
| 6 | 0 | -4.82E-03 | 9.68E-05 | 3.10E-04 |
| 7 | 0 | 1.23E-02 | 7.83E-04 | -6.36E-06 |
| 8 | 0 | 8.17E-03 | 3.87E-04 | -1.27E-04 |
| 9 | 0 | -2.42E-04 | 1.75E-04 | -9.31E-06 |
| 10 | 0 | -3.48E-03 | 5.11E-04 | -2.23E-05 |
| 11 | 0 | -4.29E-03 | -3.89E-05 | 9.66E-07 |
| 12 | 0 | -7.52E-03 | -8.80E-04 | 5.68E-05 |
| 13 | 0 | -8.79E-03 | -1.91E-04 | -3.47E-05 |
| 14 | 0 | -4.07E-04 | 2.60E-04 | -1.49E-05 |
| 15 | 0 | -9.69E-03 | 5.18E-04 | 3.09E-05 |
| 16 | 0 | -1.72E-02 | 1.23E-03 | -2.91E-05 |
| 17 | 0 | -4.98E-03 | 4.71E-04 | 2.44E-05 |
| 18 | 0 | -3.02E-03 | -2.43E-04 | 5.41E-05 |
| 19 | 0 | -1.10E-03 | -1.75E-04 | 1.09E-05 |
| 20 | 0 | 3.79E-03 | -1.10E-04 | 7.80E-06 |

18 gives the values for $\Delta d$, as defined in FIGS. 1B-1C. As visible, $\Delta d < 0.25$ mm. A small $\Delta d$ is beneficial.

L1, L2 are uniformly close to each other. A lens pair $L_i$, $L_{i+1}$ is "uniformly close to each other", if for all values between OA and DA/2 (i.e. a margin of $L_i$ or $L_{i+1}$) along the y-axis, the lens pair fulfils all of these three criteria:

1. A maximum distance ("Max-d") between $L_i$ and $L_{i+1}$ measured along the z-axis at any position along the y-axis is Max-$d_{Li-Li+1} < 0.5$ mm.
2. An average of the distance between $L_i$ and $L_{i+1}$ ("$\mu_{Li-Li+1}$") measured along the z-axis is $\mu_{Li-Li+1} < 0.25$ mm,
3. A standard deviation of the average $\mu_{Li-Li+1}$ ("$\sigma_{Li-Li+1}$") is $\sigma_{Li-Li+1} < 0.1$ mm.

Lens pair L1, L2 is a "doublet lens", what is beneficial for achieving low chromatic aberration. Herein, a lens pair $L_i$, $L_{i+1}$ is defined a "doublet lens" if it fulfils all of these three criteria:

1. Lens pair $L_i$, $L_{i+1}$ is uniformly close to each other according to above definition,
2. The ratio of the refractive index ("n") of $L_i$, $L_{i+1}$ is $n_{i+1} \geq n_i + 0.03$,
3. The ratio of the Abbe number ("v") is $v_i / v_{i+1} > 1.4$.

Herein, a lens pair $L_i$, $L_{i+1}$ is defined an "inverted doublet lens", if it fulfils all of these three criteria:

1. Lens pair $L_i$, $L_{i+1}$ is uniformly close to each other,
2. The ratio of the refractive index ("n") of $L_i$, $L_{i+1}$ is $n_i \geq n_{i+1} + 0.03$,
3. The ratio of the Abbe number ("v") is $v_{i+1} / v_i > 1.4$.

Table 5 shows all doublet lenses and inverted doublet lenses that are included in the optical lens system examples 600-800 disclosed herein as well as values thereof (Max-d, $\mu$, $\sigma$ given in mm, n and v given without units). "Type" specifies whether the lens pair is a doublet lens ("D") or an inverted doublet lens ("ID").

TABLE 5

|  | 600 | 600 | 700 | 700 | 700 | 700 | 800 | 800 | 800 |
|---|---|---|---|---|---|---|---|---|---|
| Lens pair | L1, L2 | L8, L9 | L1, L2 | L3, L4 | L6, L7 | L8, L9 | L1, L2 | L3, L4 | L7, L8 |
| Type | D | D | D | D | ID | D | ID | ID | D |
| Max-d | 0.345 | 0.170 | 0.062 | 0.195 | 0.064 | 0.346 | 0.145 | 0.185 | 0.265 |
| $\mu_{Li-Li+1}$ | 0.237 | 0.106 | 0.050 | 0.141 | 0.045 | 0.231 | 0.130 | 0.073 | 0.109 |
| $\sigma_{Li-Li+1}$ | 0.057 | 0.044 | 0.010 | 0.042 | 0.012 | 0.095 | 0.019 | 0.024 | 0.060 |
| $n_i$ | 1.54 | 1.54 | 1.54 | 1.54 | 1.61 | 1.54 | 1.64 | 1.67 | 1.53 |
| $n_{i+1}$ | 1.64 | 1.61 | 1.67 | 1.67 | 1.53 | 1.61 | 1.54 | 1.54 | 1.67 |
| $v_i$ | 55.93 | 55.93 | 55.93 | 55.93 | 25.59 | 55.93 | 23.52 | 19.24 | 55.69 |
| $v_{i+1}$ | 23.52 | 25.59 | 19.24 | 19.24 | 55.69 | 25.59 | 55.93 | 55.93 | 19.24 |
| $n_i - n_{i+1}$ | -0.1 | -0.07 | -0.13 | -0.13 | 0.08 | -0.07 | 0.1 | 0.13 | -0.14 |
| $v_i/v_{i+1}$ | 2.38 | 2.19 | 2.91 | 2.91 |  | 2.19 |  |  | 2.89 |
| $v_{i+1}/v_i$ |  |  |  |  | 2.18 |  | 2.38 | 2.91 |  |

Movements between the lens groups required for continuously switching lens 604 between $\text{EFL}_{MIN}$ and $\text{EFL}_{MAX}$ as well as F/# and HFOV are given in Table 3. Note that here and in other optical lens systems disclosed herein, the F/# can be increased by further closing the lens aperture. For switching lens 604 any state between the extreme states $\text{EFL}_{MIN}$ and $\text{EFL}_{MAX}$, a maximum movement (or stroke "s") of G24 lens group S=3.69 mm is required, as detailed in Table 1. A ratio R of the EFL differences in the extreme states and S is $R = (\text{EFL}_{MAX} - \text{EFL}_{MIN})/S = 3.91$, as well detailed in Table 1. Maximizing R is desired, as, (1) for a given ZF range, determined by $\text{EFL}_{MAX} - \text{EFL}_{MIN}$, a smaller stroke S is required for switching between $\text{EFL}_{MAX}$ and $\text{EFL}_{MIN}$, or, (2) for a given stroke S, a larger ZF range, determined by $\text{EFL}_{MAX} - \text{EFL}_{MIN}$, is provided. In addition, G1+G2+G3+G4 together must be moved as one lens with respect to image sensor 608 as specified in FIG. 6C. FIG. 6C

FIGS. 7A-7B show another G24 optical lens system 700 disclosed herein that may be included into a G24 FCZT camera like camera 160. FIG. 7A shows optical lens system 700 in a minimal zoom state having an $\text{EFL}_{MIN} = 9.96$ mm. FIG. 7B shows optical lens system 700 in a maximum zoom state having an $\text{EFL}_{MAX} = 27.0$ mm. The transition or switching from $\text{EFL}_{MAX}$ to $\text{EFL}_{MIN}$ or vice versa can be performed continuously.

Optical lens system 700 comprises a lens 704 having a lens optical axis 702, an (optional) optical element 706 and an image sensor 708. System 700 is shown with ray tracing. Lens 704 is divided into G1, G2, G3 and G4. G1 includes L1-L2, G2 includes L3-L4, G3 includes L5-L7 and G4 includes L8-L10.

Detailed optical data and surface data for system 700 are given in Tables 6-8. Surface types are defined in Table 6. Movements between the lens groups required for continuously switching lens 704 between $EFL_{MIN}$ and $EFL_{MAX}$ as well as F/# and HFOV are given in Table 7. The coefficients for the surfaces are defined in Table 8.

FIGS. 8A-8C show a G13 optical lens system 800 disclosed herein that may be included into a G13 FCZT camera like camera 170. FIG. 8A shows optical lens system 800 in

TABLE 6

Optical lens system 700

| Surface # | Comment | Type | Curvature Radius | Thickness | Aperture Radius (D/2) | Material | Index | Abbe # | Focal Length |
|---|---|---|---|---|---|---|---|---|---|
| 1 | Lens 1 | ASP | 10.760 | 1.114 | 3.03 | Plastic | 1.544 | 55.933 | 11.31 |
| 2 | | | −13.957 | 0.037 | 2.98 | | | | |
| 3 | Lens 2 | ASP | −15.044 | 0.346 | 2.95 | Plastic | 1.671 | 19.239 | −29.90 |
| 4 | | | −59.099 | See Table 7 | 2.90 | | | | |
| 5 | Lens 3 | ASP | −5.658 | 0.664 | 2.03 | Plastic | 1.544 | 55.933 | −3.91 |
| 6 | | | 3.576 | 0.195 | 1.91 | | | | |
| 7 | Lens 4 - Stop | ASP | 6.437 | 0.527 | 1.92 | Plastic | 1.671 | 19.239 | 13.61 |
| 8 | | | 20.638 | See Table 7 | 1.90 | | | | |
| 9 | Lens 5 | ASP | 6.779 | 1.601 | 3.11 | Plastic | 1.544 | 55.933 | 9.67 |
| 10 | | | −21.887 | 0.615 | 3.11 | | | | |
| 11 | Lens 6 | ASP | 11.188 | 0.913 | 3.0 | Plastic | 1.614 | 25.587 | −10.93 |
| 12 | | | 4.082 | 0.064 | 2.96 | | | | |
| 13 | Lens 7 | ASP | 4.732 | 1.815 | 2.99 | Plastic | 1.535 | 55.686 | 7.16 |
| 14 | | | −17.663 | See Table 7 | 2.97 | | | | |
| 15 | Lens 8 | ASP | −14.688 | 1.363 | 2.63 | Plastic | 1.544 | 55.933 | 49.56 |
| 16 | | | −9.833 | 0.346 | 2.64 | | | | |
| 17 | Lens 9 | ASP | −4.622 | 0.591 | 2.62 | Plastic | 1.614 | 25.587 | −9.13 |
| 18 | | | −26.680 | 0.614 | 2.67 | | | | |
| 19 | Lens 10 | ASP | −16.100 | 1.845 | 2.96 | Plastic | 1.588 | 28.365 | 13.37 |
| 20 | | | −5.528 | See Table 7 | 2.994 | | | | |
| 21 | Filter | Plano | Infinity | 0.179 | — | Glass | 1.52 | 64.17 | |
| 22 | | | Infinity | 2.55E−01 | — | | | | |
| 23 | Image | Plano | Infinity | — | — | | | | |

EFL = see Table 7,
F number = see Table 7,
HFOV = see Table 7.

TABLE 7

| | EFL = 9.96 | EFL = 27.00 |
|---|---|---|
| Surface 4 | 0.756 | 5.969 |
| Surface 8 | 5.357 | 0.145 |
| Surface 14 | 2.647 | 7.859 |
| Surface 20 | 7.492 | 2.279 |
| F/# | 2.59 | 4.66 |
| HFOV [deg] | 14.63 | 5.36 | a minimal zoom state having an $EFL_{MIN}=10$ mm. FIG. 8B shows optical lens system 800 in an intermediate zoom state having an $EFL_{MID}=20$ mm. FIG. 8C shows optical lens system 800 in a maximum zoom state having an $EFL_{MAX}=30$ mm. The transition or switching from $EFL_{MAX}$ to $EFL_{MIN}$ or vice versa can be performed continuously.

Optical lens system 800 comprises a lens 804 having a lens optical axis 802, an (optional) optical element 806 and an image sensor 808. System 800 is shown with ray tracing. Lens 804 is divided into G1, G2, G3 and G4. G1 includes

TABLE 8

Aspheric Coefficients

| Surface # | Conic | A4 | A6 | A8 | A10 | A12 | A14 |
|---|---|---|---|---|---|---|---|
| 1 | 0 | −2.09E−04 | −6.72E−06 | 1.84E−06 | −3.40E−07 | 3.13E−09 | 0.00E+00 |
| 2 | 0 | −1.69E−03 | 3.59E−04 | −2.62E−05 | 1.51E−07 | 1.30E−08 | 0.00E+00 |
| 3 | 0 | −1.49E−03 | 2.71E−04 | −1.64E−05 | 9.36E−08 | −7.70E−09 | 0.00E+00 |
| 4 | 0 | −2.25E−04 | −3.76E−05 | 8.14E−06 | −4.38E−07 | −1.22E−08 | 0.00E+00 |
| 5 | 0 | −3.66E−03 | 1.39E−03 | −1.37E−04 | 5.24E−06 | −5.29E−07 | 7.11E−08 |
| 6 | 0 | −3.95E−03 | 7.26E−06 | −5.42E−05 | 2.91E−05 | −3.70E−06 | 2.61E−08 |
| 7 | 0 | 9.60E−03 | −9.24E−04 | −9.52E−05 | 4.31E−05 | −5.81E−06 | 8.74E−08 |
| 8 | 0 | 5.80E−03 | 1.94E−04 | −1.54E−04 | 2.15E−05 | −3.42E−06 | 1.09E−07 |
| 9 | 0 | −8.05E−04 | −4.67E−05 | 2.59E−06 | −6.62E−07 | 6.21E−08 | 0.00E+00 |
| 10 | 0 | −5.30E−03 | 3.88E−04 | −1.44E−05 | −4.50E−08 | 4.55E−08 | 0.00E+00 |
| 11 | 0 | −8.55E−03 | 4.35E−04 | 1.11E−05 | −8.55E−07 | −1.02E−08 | 0.00E+00 |
| 12 | 0 | −7.01E−03 | −3.12E−05 | 4.38E−05 | −1.70E−06 | −4.98E−08 | 0.00E+00 |
| 13 | 0 | −3.56E−03 | −1.54E−04 | 3.94E−05 | −3.53E−07 | −6.70E−08 | 0.00E+00 |
| 14 | 0 | −1.16E−03 | 5.73E−05 | 1.34E−05 | −1.43E−06 | 8.89E−08 | 0.00E+00 |
| 15 | 0 | 1.57E−03 | 1.34E−05 | −4.86E−05 | 3.67E−06 | 2.84E−09 | 0.00E+00 |
| 16 | 0 | 6.54E−03 | −6.95E−05 | −6.95E−05 | −1.20E−06 | −8.19E−08 | 0.00E+00 |
| 17 | 0 | 8.78E−03 | −7.15E−05 | −3.75E−05 | 4.84E−07 | −3.42E−07 | 0.00E+00 |
| 18 | 0 | 5.05E−03 | 2.13E−04 | 3.57E−06 | 2.67E−07 | 0.00E+00 | 0.00E+00 |
| 19 | 0 | 3.99E−03 | 1.93E−04 | 1.99E−05 | −1.52E−06 | 2.39E−08 | −1.87E−09 |
| 20 | 0 | 2.47E−03 | −1.65E−05 | 1.47E−05 | −5.58E−07 | 4.20E−08 | 4.51E−10 |

L1-L2, G2 includes L3-L5, G3 includes L6-L8 and G4 includes L9-L10.

Detailed optical data and surface data for system 800 are given in Tables 9-11. Surface types are defined in Table 9.

Movements between the lens groups required for continuously switching lens 804 between $EFL_{MIN}$ and $EFL_{MAX}$ as well as F/# and HFOV are given in Table 10. The coefficients for the surfaces are defined in Table 11.

TABLE 9

| | | | | | | | | | Focal Length [mm] | |
|---|---|---|---|---|---|---|---|---|---|---|
| Group | Lens | Surface | Type | R [mm] | T [mm] | D [mm] | Nd | Vd | | |
| Object | | S0 | Flat | Infinity | Infinity | | | | | |
| G1 | L1 | $S_1$ | QTYP | 9.6942 | 1.2175 | 3.5801 | 1.6392 | 23.5174 | −24.5407 | 16.1040 |
| | | $S_2$ | QTYP | 5.7130 | 0.1359 | 3.1917 | | | | |
| | L2 | $S_3$ | QTYP | 5.1388 | 1.7544 | 3.2006 | 1.5443 | 55.9329 | 9.3046 | |
| | | $S_4$ | QTYP | −397.6066 | See Table 10 | 3.1068 | | | | |
| G2 | L3 | $S_5$ | QTYP | −33.5732 | 0.7020 | 2.4949 | 1.6707 | 19.2389 | 10.1444 | −3.9604 |
| | | $S_6$ | QTYP | −5.7492 | 0.0500 | 2.4513 | | | | |
| | L4 | $S_7$ | QTYP | −13.3042 | 0.3300 | 2.2940 | 1.5443 | 55.9329 | −5.5391 | |
| | | $S_7$ | QTYP | 3.9491 | 1.0954 | 1.8547 | | | | |
| | L5 | $S_9$ | QTYP | −7.9227 | 0.3300 | 1.7701 | 1.5443 | 55.9329 | −6.2960 | |
| | | $S_{10}$ | QTYP | 6.1633 | See Table 10 | 1.9220 | | | | |
| G3 | L6 | $S_{11}$ (Stop) | QTYP | 7.0120 | 0.9445 | 2.0413 | 1.5443 | 55.9329 | 8.8606 | 5.5857 |
| | | $S_{12}$ | QTYP | −14.8678 | 0.0500 | 2.1842 | | | | |
| | L7 | $S_{13}$ | QTYP | 12.2606 | 1.2768 | 2.3475 | 1.5348 | 55.6857 | 6.8071 | |
| | | $S_{14}$ | QTYP | −5.0129 | 0.0500 | 2.3504 | | | | |
| | L8 | $S_{15}$ | QTYP | −7.3898 | 0.8705 | 2.2903 | 1.6707 | 19.2389 | −13.2301 | |
| | | $S_{16}$ | QTYP | −44.2657 | See Table 10 | 2.1933 | | | | |
| G4 | L9 | $S_{17}$ | QTYP | −8.3488 | 1.2159 | 2.2212 | 1.6142 | 25.5871 | −10.1466 | 154.5022 |
| | | $S_{18}$ | QTYP | 26.6866 | 1.7515 | 2.3750 | | | | |
| | L10 | $S_{19}$ | QTYP | −500.5411 | 1.7510 | 3.0147 | 1.5875 | 28.3647 | 12.7415 | |
| | | $S_{20}$ | QTYP | −7.4311 | 9.7121 | 3.0029 | | | | |
| Glass window | | $S_{21}$ | Flat | Infinity | 0.2100 | | 1.5168 | 64.1673 | | |
| | | $S_{22}$ | Flat | Infinity | 0.3000 | | | | | |
| Image sensor | | $S_{23}$ | | | | | | | | |

EFL = see Table 10,
F number = see Table 8,
HFOV = see Table 10.

TABLE 10

| | | Configuration 1 EFL = 10 [mm] | Configuration 2 EFL = 20 [mm] | Configuration 3 EFL = 30 [mm] |
|---|---|---|---|---|
| T [mm] | $S_4$ | 0.5551 | 2.9477 | 4.2581 |
| | $S_{10}$ | 4.2005 | 1.8079 | 0.4975 |
| | $S_{16}$ | 1.0154 | 3.4080 | 4.7184 |
| F/# | | 3.38 | 4.08 | 4.46 |
| HFOV | | 17.02 | 8.43 | 5.62 |

TABLE 11

| Surface | Conic (k) | NR | $A_0$ | $A_1$ | $A_2$ | $A_3$ | $A_4$ | $A_5$ | $A_6$ |
|---|---|---|---|---|---|---|---|---|---|
| $S_1$ | 0 | 3.5800E+00 | 1.1491E−01 | −2.8917E−02 | 1.7143E−03 | −2.5910E−04 | 6.5830E−05 | 3.1372E−06 | −8.1380E−06 |
| $S_2$ | 0 | 3.2404E+00 | 2.0800E−01 | −4.4183E−02 | 7.7743E−04 | −8.8972E−05 | 5.6426E−05 | 1.1177E−05 | −5.1629E−05 |
| $S_3$ | 0 | 3.2513E+00 | −1.7304E−02 | −2.3956E−02 | −4.6667E−04 | 2.7248E−04 | 3.7931E−05 | 1.9795E−05 | −4.8777E−05 |
| $S_4$ | 0 | 3.1457E+00 | −9.4934E−02 | 4.7895E−03 | −5.9032E−04 | 3.3997E−04 | −2.8749E−05 | 1.5586E−05 | −8.2102E−07 |
| $S_5$ | 0 | 2.3902E+00 | 1.3198E−01 | −3.8200E−02 | −8.8324E−03 | −1.6995E−03 | 4.5851E−04 | 2.0698E−04 | 5.0679E−05 |
| $S_6$ | 0 | 2.2470E+00 | 1.5614E−01 | −1.2560E−02 | −3.1075E−03 | −5.3334E−04 | 1.2627E−04 | 2.1103E−05 | 1.0284E−05 |
| $S_7$ | 0 | 2.2051E+00 | −1.0725E−01 | 7.6028E−02 | −6.0832E−03 | 3.0963E−03 | −4.9030E−04 | 1.7973E−04 | −2.0049E−05 |
| $S_8$ | 0 | 1.8535E+00 | −1.6541E−01 | 2.2861E−02 | −2.5045E−03 | 8.2602E−04 | −2.7614E−04 | 9.7694E−06 | −2.7978E−06 |
| $S_9$ | 0 | 1.8405E+00 | −3.4565E−01 | 1.6856E−02 | −4.3840E−03 | 4.5201E−04 | −3.3516E−04 | 1.0012E−05 | 2.4078E−05 |
| $S_{10}$ | 0 | 1.9899E+00 | −3.2868E−01 | 4.3924E−02 | −7.4263E−03 | 1.4795E−03 | −4.0483E−04 | 1.1174E−04 | −7.5844E−06 |
| $S_{11}$ | 0 | 2.1098E+00 | −2.9218E−01 | −3.2879E−02 | −5.3227E−04 | 1.7710E−03 | −3.4398E−05 | −8.0419E−05 | −3.8515E−05 |
| $S_{12}$ | 0 | 2.2540E+00 | −4.5958E−01 | 7.9424E−03 | 1.0271E−04 | 1.1537E−03 | −8.7776E−04 | 2.3072E−04 | −1.4673E−04 |
| $S_{13}$ | 0 | 2.4095E+00 | −8.7987E−02 | 5.8921E−02 | 1.5630E−03 | −3.9633E−03 | −7.9363E−04 | 7.9334E−04 | −1.2551E−04 |
| $S_{14}$ | 0 | 2.4176E+00 | 1.1392E−01 | −1.3685E−02 | 6.7038E−03 | −7.3149E−04 | −2.1211E−04 | 1.3974E−04 | 5.2531E−05 |
| $S_{15}$ | 0 | 2.3565E+00 | 1.2110E−01 | 7.3093E−03 | −2.0647E−03 | 1.3576E−03 | −1.6472E−05 | 1.7699E−04 | −2.7937E−05 |
| $S_{16}$ | 0 | 2.2654E+00 | 1.1979E−01 | 1.2232E−02 | −1.4439E−03 | 1.0863E−03 | −2.6553E−05 | 7.4177E−05 | −3.6304E−05 |
| $S_{17}$ | 0 | 2.2802E+00 | 8.0600E−02 | −1.7121E−02 | 3.0490E−03 | −2.6796E−04 | −3.5541E−05 | −2.4619E−05 | −2.5559E−06 |
| $S_{18}$ | 0 | 2.4245E+00 | 2.0883E−01 | −3.8259E−02 | 5.3459E−03 | −1.8825E−04 | −1.6586E−04 | −5.2039E−06 | −9.4617E−05 |
| $S_{19}$ | 0 | 3.0755E+00 | 5.5056E−01 | −4.6892E−02 | 6.7617E−03 | −7.8801E−05 | −1.4180E−04 | −6.3231E−05 | −4.4062E−05 |
| $S_{20}$ | 0 | 3.0275E+00 | 3.6419E−01 | −1.0546E−03 | 4.2089E−04 | 5.2717E−04 | −8.8110E−06 | −1.4724E−05 | −4.9271E−05 |

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A camera, comprising:
an optical path folding element (OPFE) for a folding a first optical path OP1 to second optical path OP2;
a lens including a plurality of lens elements divided into four lens groups arranged along a lens optical axis and marked, in order from an object side of the lens to an image side of the lens, G1, G2, G3 and G4; and
an image sensor,
wherein the camera is a folded Tele camera,
wherein the lens elements of a lens group do not move with respect to each other,
wherein G1 and G3 do not move with respect to each other,
wherein G2 and G4 do not move with respect to each other,
wherein the Tele camera is configured to change a zoom factor (ZF) continuously between a minimal zoom factor marked $ZF_{MIN}$ corresponding to a minimal effective focal length marked $EFL_{MIN}$ and a maximal zoom factor marked $ZF_{MAX}$ corresponding to a maximal effective focal length marked $EFL_{MAX}$ by moving G1 and G3 together relative to the image sensor and by moving G2 and G4 together relative to the image sensor,
wherein $ZF_{MAX}/ZF_{MIN} \geq 1.5$,
wherein the camera has an aperture diameter $DA_{MIN}$ at $EFL_{MIN}$ and a minimal F number $F/\#_{MIN} = EFL_{MIN}/DA_{MIN}$, and
wherein $F/\#_{MIN}$ is <4.

2. The camera of claim 1, wherein $F/\#_{MIN}$ is <3.

3. The camera of claim 1, wherein the camera has an aperture diameter $DA_{MAX}$ at $EFL_{MAX}$, and a maximal F number $F/\#_{MAX} = EFL_{MAX}/DA_{MAX}$, and wherein j4.4<$F/\#_{MAX}$<6.

4. The camera of claim 1, wherein the lens has a maximal total track length $TTL_{MAX}$, and wherein the ratio $TTL_{MAX}/EFL_{MAX}$<1.2.

5. The camera of claim 1, wherein the camera is included in a camera module having a module height $H_M$, wherein the lens has a lens aperture height $H_A$, wherein both $H_M$ and $H_A$ are measured along an axis parallel to OP1, wherein $H_M$=5 mm-15 mm, wherein $H_A$=3 mm-10 mm, and wherein $H_M$<$H_A$+3 mm.

6. The camera of claim 5, wherein $H_M$<$H_A$+2 mm.

7. The camera of claim 1, wherein the camera has an aperture diameter $DA_{MAX}$ at $EFL_{MAX}$, wherein $EFL_{MAX}$ is between 24 mm and 30 mm, and wherein 5 mm<$DA_{MAX}$<7 mm.

8. The camera of claim 1, wherein $EFL_{MAX}$ is between 24 mm and 30 mm.

9. The camera of claim 1, wherein $EFL_{MIN} \geq 9$ mm.

10. The camera of claim 1, included in a mobile device.

11. The camera of claim 10, wherein the mobile device is a smartphone.

12. A camera, comprising:
an optical path folding element (OPFE) for a folding a first optical path OP1 to second optical path OP2;
a lens including a plurality of lens elements divided into four lens groups arranged along a lens optical axis and marked, in order from an object side of the lens to an image side of the lens, G1, G2, G3 and G4; and
an image sensor,
wherein the camera is a folded Tele camera,
wherein the lens elements of a lens group do not move with respect to each other,
wherein G1 and G3 do not move with respect to each other,
wherein G2 and G4 do not move with respect to each other,
wherein the Tele camera is configured to change a zoom factor (ZF) continuously between a minimal zoom factor marked $ZF_{MIN}$ corresponding to a minimal effective focal length marked $EFL_{MIN}$ and a maximal zoom factor marked $ZF_{MAX}$ corresponding to a maximal effective focal length marked $EFL_{MAX}$ by moving G1 and G3 together relative to the image sensor and by moving G2 and G4 together relative to the image sensor,
wherein $ZF_{MAX}/ZF_{MIN} \geq 1.5$,
wherein the lens has a maximal total track length $TTL_{MAX}$, and
wherein the ratio $TTL_{MAX}/EFL_{MAX}$<1.2.

13. The camera of claim 12, wherein $F/\#_{MIN}$ is <4.

14. The camera of claim 12, wherein the camera has an aperture diameter $DA_{MAX}$ at $EFL_{MAX}$, and a maximal F number $F/\#_{MAX} = EFL_{MAX}/DA_{MAX}$, and wherein 4.4<$F/\#_{MAX}$<6.

15. The camera of claim 12, wherein the camera is included in a camera module having a module height $H_M$, wherein the lens has a lens aperture height $H_A$, wherein both $H_M$ and $H_A$ are measured along an axis parallel to OP1, wherein $H_M$=5 mm-15 mm, wherein $H_A$=3 mm-10 mm, and wherein $H_M$<$H_A$+3 mm.

16. The camera of claim 15, wherein $H_M$<$H_A$+2 mm.

17. The camera of claim 12, wherein $EFL_{MAX}$ is between 24 mm and 30 mm.

18. The camera of claim 12, wherein $EFL_{MIN} \geq 9$ mm.

19. The camera of claim 12, included in a mobile device.

20. The camera of claim 19, wherein the mobile device is a smartphone.

* * * * *